US011113196B2

(12) United States Patent
Das Sharma et al.

(10) Patent No.: US 11,113,196 B2
(45) Date of Patent: Sep. 7, 2021

(54) SHARED BUFFERED MEMORY ROUTING

(71) Applicant: Intel Corporation, Santa Clara, CA (US)

(72) Inventors: Debendra Das Sharma, Saratoga, CA (US); Michelle C. Jen, Mountain View, CA (US); Brian S. Morris, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 16/140,482

(22) Filed: Sep. 24, 2018

(65) Prior Publication Data

US 2019/0108124 A1 Apr. 11, 2019

Related U.S. Application Data

(63) Continuation of application No. 15/665,541, filed on Aug. 1, 2017, now abandoned, which is a continuation of application No. 14/670,578, filed on Mar. 27, 2015, now Pat. No. 9,720,838.

(51) Int. Cl.
*G06F 12/08* (2016.01)
*G06F 3/06* (2006.01)
(Continued)

(52) U.S. Cl.
CPC ............ *G06F 12/084* (2013.01); *G06F 3/061* (2013.01); *G06F 3/0635* (2013.01);
(Continued)

(58) Field of Classification Search
CPC .... G06F 12/00; G06F 12/084; G06F 12/0848; G06F 13/00; G06F 3/06; G06F 12/0806; G06F 3/061; G06F 3/0635; G06F 3/0673
(Continued)

(56) References Cited

U.S. PATENT DOCUMENTS

| | | | |
|---|---|---|---|
| 6,751,698 B1 * | 6/2004 | Deneroff | G06F 15/17343 710/317 |
| 7,571,185 B2 | 8/2009 | Okamoto et al. | |

(Continued)

FOREIGN PATENT DOCUMENTS

| | | |
|---|---|---|
| CN | 101203838 A | 6/2008 |
| CN | 101673255 A | 3/2010 |

(Continued)

OTHER PUBLICATIONS

English translation of First Office Action and Search Report issued for Taiwanese Patent Application No. TW105105506, dated Jun. 22, 2017, 8 pages.

(Continued)

*Primary Examiner* — Tuan V Thai

(74) *Attorney, Agent, or Firm* — Alliance IP, LLC

(57) ABSTRACT

A shared memory controller receives a flit from another first shared memory controller over a shared memory link, where the flit includes a node identifier (ID) field and an address of a particular line of the shared memory. The node ID field identifies that the first shared memory controller corresponds to a source of the flit. Further, a second shared memory controller is determined from at least the address field of the flit, where the second shared memory controller is connected to a memory element corresponding to the particular line. The flit is forwarded to the second shared memory controller using a shared memory link according to a routing path.

16 Claims, 17 Drawing Sheets

(51) Int. Cl.
*G06F 12/084* (2016.01)
*G06F 13/16* (2006.01)
*G06F 13/42* (2006.01)
*G06F 12/0806* (2016.01)
*G06F 12/0808* (2016.01)

(52) U.S. Cl.
CPC ........ *G06F 3/0673* (2013.01); *G06F 12/0806* (2013.01); *G06F 12/0808* (2013.01); *G06F 13/1673* (2013.01); *G06F 13/4282* (2013.01); *G06F 2212/1016* (2013.01); *G06F 2212/60* (2013.01); *G06F 2212/62* (2013.01)

(58) Field of Classification Search
USPC .......................... 711/100, 103, 117, 130, 154
See application file for complete search history.

(56) References Cited

U.S. PATENT DOCUMENTS

| | | | |
|---|---|---|---|
| 9,582,449 B2* | 2/2017 | Bennett | G06F 13/1684 |
| 2006/0143198 A1 | 6/2006 | Okamoto et al. | |
| 2007/0050538 A1 | 3/2007 | Northcutt et al. | |
| 2007/0076701 A1 | 4/2007 | Yamada | |
| 2007/0133415 A1 | 6/2007 | Spink | |
| 2008/0301256 A1* | 12/2008 | McWilliams | G06F 12/0802 |
| | | | 709/214 |
| 2010/0017572 A1 | 1/2010 | Koka et al. | |
| 2010/0191890 A1 | 7/2010 | Hum et al. | |
| 2012/0198173 A1 | 8/2012 | Xu | |
| 2014/0372658 A1* | 12/2014 | Safranek | G06F 13/4282 |
| | | | 710/314 |

FOREIGN PATENT DOCUMENTS

| | | |
|---|---|---|
| TW | 200719157 A | 5/2007 |
| WO | 2014065881 A1 | 5/2014 |

OTHER PUBLICATIONS

International Preliminary Report on Patentability for Application No. PCT/US2016/019673, dated Oct. 12, 2017, 9 Pages.
International Search Report and Written Opinion for Application No. PCT/US2016/019673, dated Jun. 8, 2016, 11 pages.
China Patent Office First Office Action in Chinese Application U.S. Appl. No. 201680018790.3 dated Mar. 30 2020 (9 pages).

* cited by examiner

SHARED BUFFERED MEMORY ROUTING

RELATED APPLICATIONS

This application is a continuation of U.S. application Ser. No. 15/665,541, filed on Aug. 1, 2017, which claims the benefit of U.S. application Ser. No. 14/670,578, filed on Mar. 27, 2015, and Issued as U.S. Pat. No. 9,720,838, on Aug. 1, 2017, the entire contents of which are hereby incorporated by reference.

FIELD

This disclosure pertains to computing system, and in particular (but not exclusively) to memory access between components in a computing system.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

Like reference numbers and designations in the various drawings indicate like elements.

DETAILED DESCRIPTION

Figure 1:
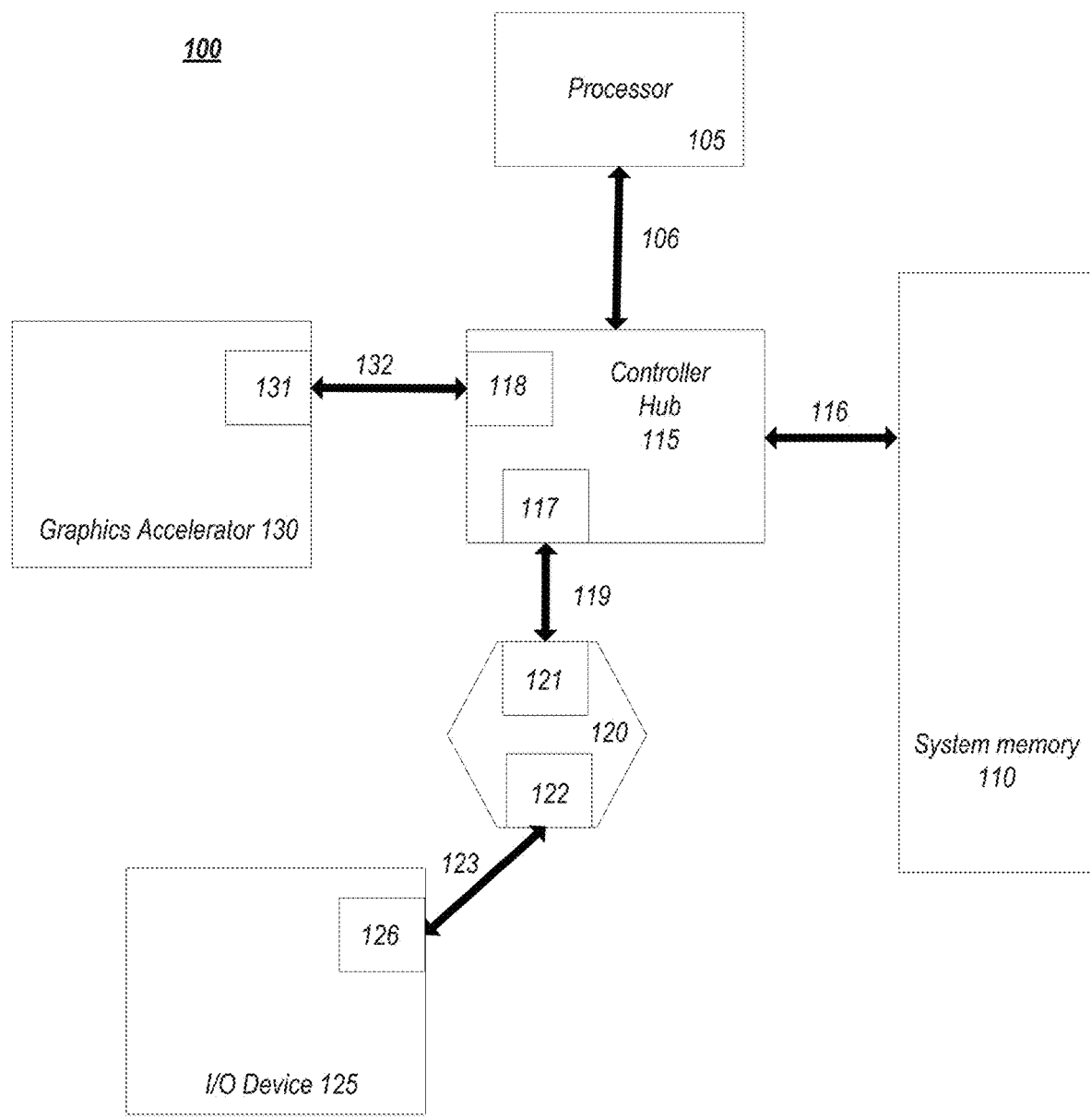
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
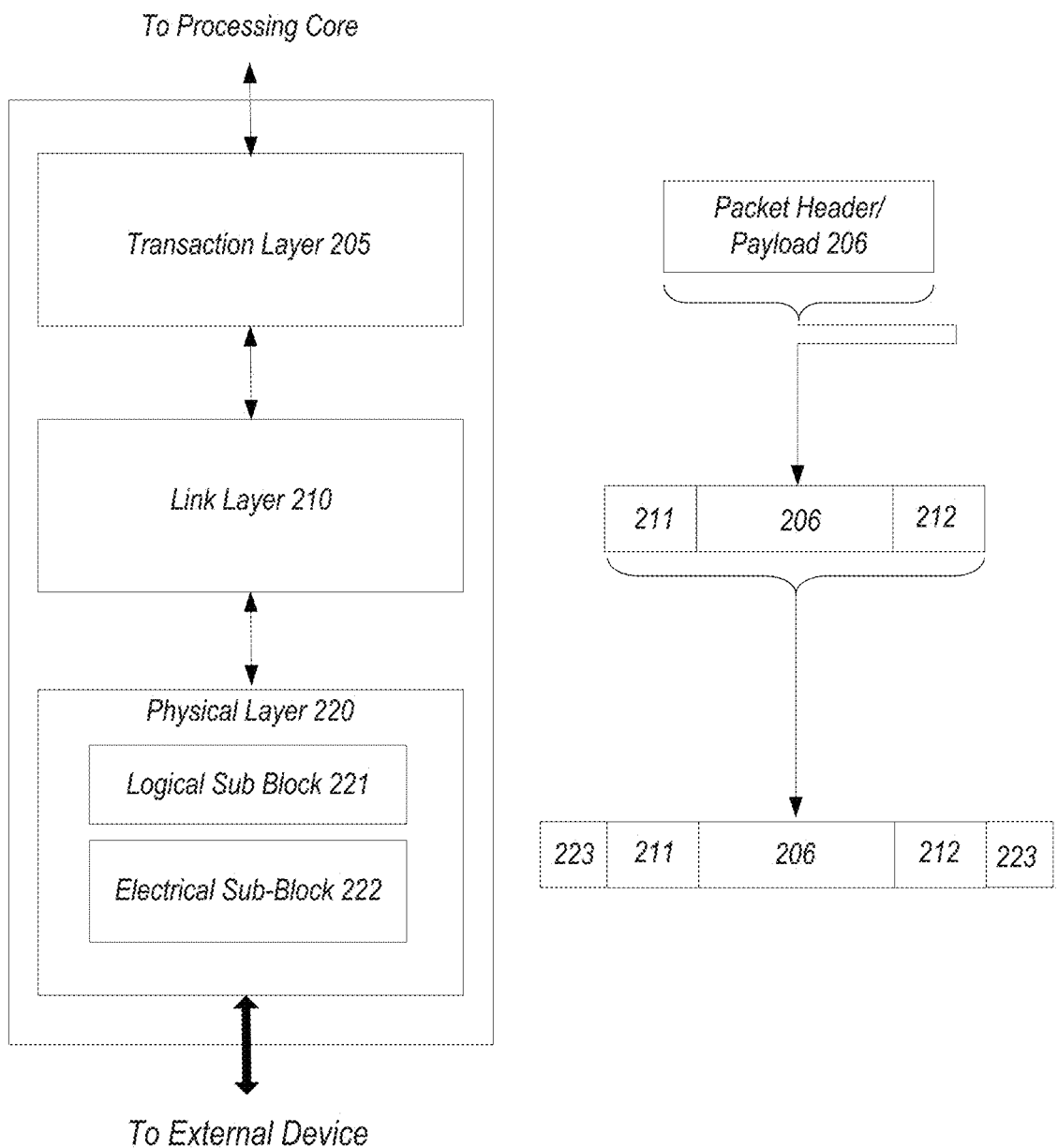
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCie stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The transaction layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
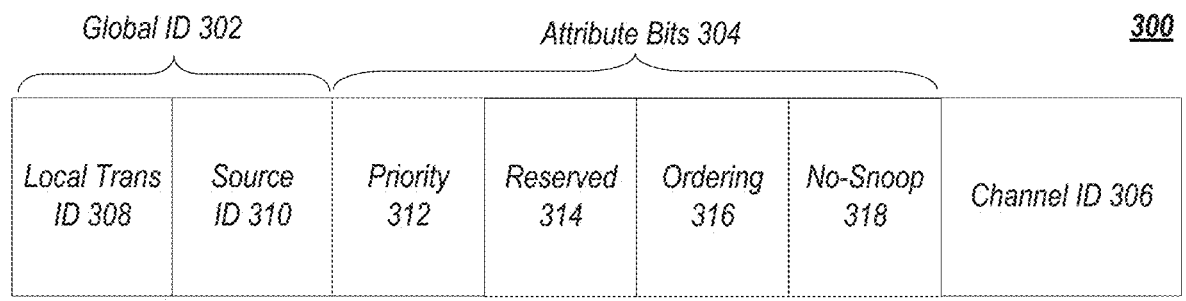
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

The physical electrical sub-block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
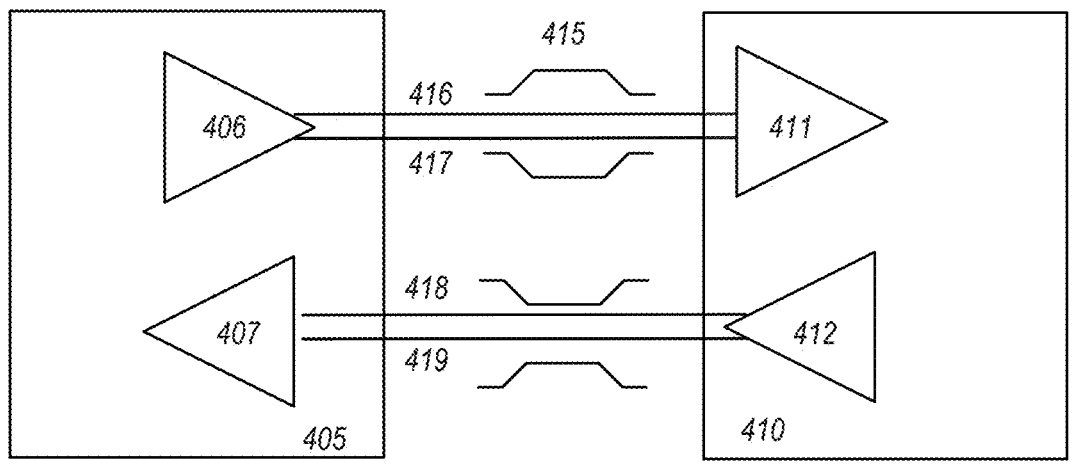
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 20, 24, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 5:
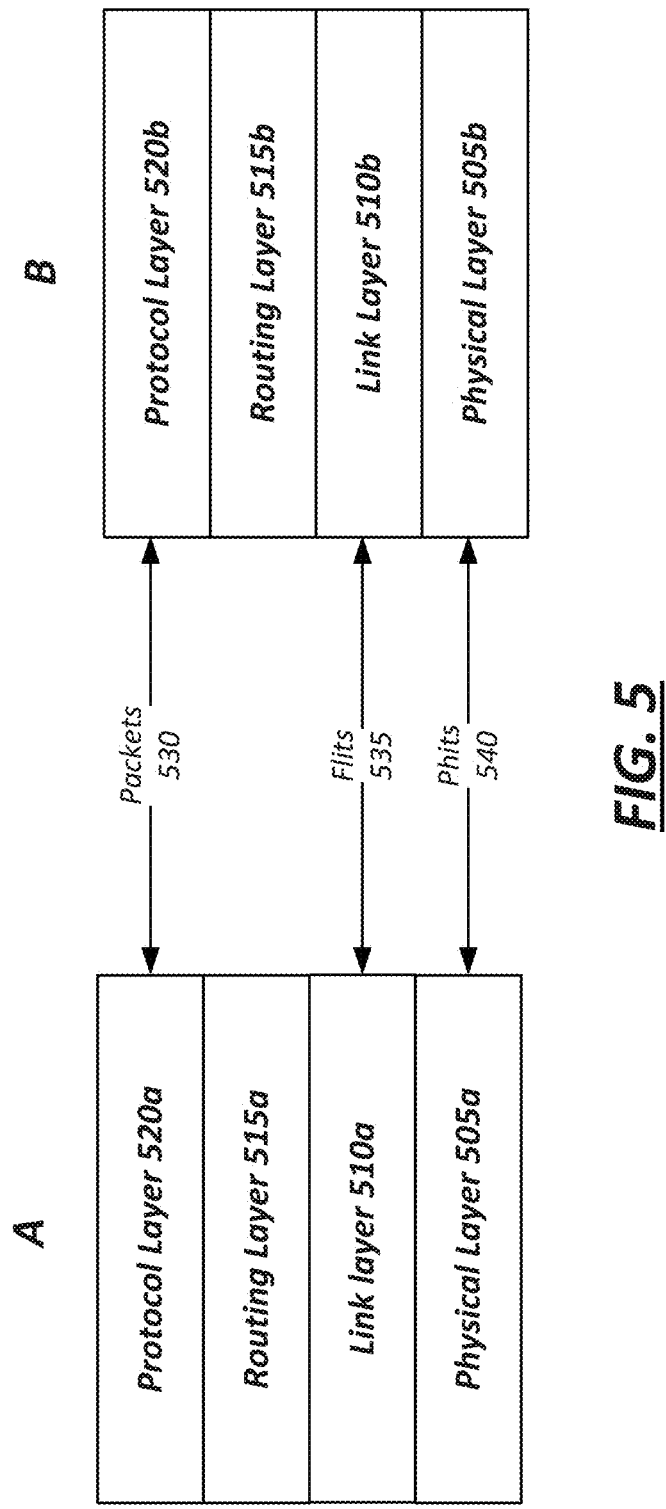
FIG. 5 illustrates an embodiment of a layered protocol stack associated with a high performance general purpose input/output (GPIO) interconnect.

In one implementation, as shown in FIG. 5, Physical layer 505a,b, can be responsible for the fast transfer of information on the physical medium (electrical or optical etc.). The physical link can be point-to-point between two Link layer entities, such as layer 505a and 505b. The Link layer 510a,b can abstract the Physical layer 505a,b from the upper layers and provides the capability to reliably transfer data (as well as requests) and manage flow control between two directly connected entities. The Link Layer can also be responsible for virtualizing the physical channel into multiple virtual channels and message classes. The Protocol layer 520a,b relies on the Link layer 510a,b to map protocol messages into the appropriate message classes and virtual channels before handing them to the Physical layer 505a,b for transfer across the physical links. Link layer 510a,b may support multiple messages, such as a request, snoop, response, writeback, non-coherent data, among other examples.

A Physical layer 505a,b (or PHY) can be implemented above the electrical layer (i.e. electrical conductors connecting two components) and below the link layer 510a,b, as illustrated in FIG. 5. The Physical layer and corresponding logic can reside on each agent and connect the link layers on two agents or nodes (A and B) separated from each other (e.g. on devices on either side of a link). The local and remote electrical layers are connected by physical media (e.g. wires, conductors, optical, etc.). The Physical layer 505a,b, in one embodiment, has two major phases, initialization and operation. During initialization, the connection is opaque to the link layer and signaling may involve a combination of timed states and handshake events. During operation, the connection is transparent to the link layer and signaling is at a speed, with all lanes operating together as a single link. During the operation phase, the Physical layer transports flits 535 from agent A to agent B and from agent B to agent A. The connection is also referred to as a link and abstracts some physical aspects including media, width and speed from the link layers while exchanging flits and control/status of current configuration (e.g. width) with the link layer. The initialization phase includes minor phases e.g. Polling, Configuration. The operation phase also includes minor phases (e.g. link power management states).

In one embodiment, Link layer 510a,b can be implemented so as to provide reliable data transfer between two protocol or routing entities. The Link layer can abstract Physical layer 505a,b from the Protocol layer 520a,b, and can be responsible for the flow control between two protocol agents (A, B), and provide virtual channel services to the Protocol layer (Message Classes) and Routing layer (Virtual Networks). The interface between the Protocol layer 520a,b and the Link Layer 510a,b can typically be at the packet level. In one embodiment, the smallest transfer unit at the Link Layer is referred to as a flit which a specified number of bits, such as 192 bits or some other denomination. The Link Layer 510a,b relies on the Physical layer 505a,b to frame the Physical layer's 505a,b unit of transfer (phit 540) into the Link Layer's 510a,b unit of transfer (flit). In addition, the Link Layer 510a,b may be logically broken into two parts, a sender and a receiver. A sender/receiver pair on one entity may be connected to a receiver/sender pair on another entity. Flow Control is often performed on both a flit and a packet basis. Error detection and correction is also potentially performed on a flit level basis.

In one embodiment, Routing layer 515a,b can provide a flexible and distributed method to route transactions from a source to a destination. The scheme is flexible since routing algorithms for multiple topologies may be specified through programmable routing tables at each router (the programming in one embodiment is performed by firmware, software, or a combination thereof). The routing functionality may be distributed; the routing may be done through a series of routing steps, with each routing step being defined through a lookup of a table at either the source, intermediate, or destination routers. The lookup at a source may be used to inject a packet into the fabric. The lookup at an intermediate router may be used to route an packet from an input port to an output port. The lookup at a destination port may be used to target the destination protocol agent. Note that the Routing layer, in some implementations, can be thin since the routing tables, and, hence the routing algorithms, are not specifically defined by specification. This allows for flexibility and a variety of usage models, including flexible platform architectural topologies to be defined by the system implementation. The Routing layer 515*a,b* relies on the Link layer 510*a,b* for providing the use of up to three (or more) virtual networks (VNs)—in one example, two deadlock-free VNs, VN0 and VN1 with several message classes defined in each virtual network. A shared adaptive virtual network (VNA) may be defined in the Link layer, but this adaptive network may not be exposed directly in routing concepts, since each message class and virtual network may have dedicated resources and guaranteed forward progress, among other features and examples.

In one embodiment, Protocol Layer 520*a,b* can provide a Coherence Protocol to support agents caching lines of data from memory. An agent wishing to cache memory data may use the coherence protocol to read the line of data to load into its cache. An agent wishing to modify a line of data in its cache may use the coherence protocol to acquire ownership of the line before modifying the data. After modifying a line, an agent may follow protocol requirements of keeping it in its cache until it either writes the line back to memory or includes the line in a response to an external request. Lastly, an agent may fulfill external requests to invalidate a line in its cache. The protocol ensures coherency of the data by dictating the rules all caching agents may follow. It also provides the means for agents without caches to coherently read and write memory data.

Physical layers of existing interconnect and communication architectures, including PCIe, can be leveraged to provide shared memory and I/O services within a system. Traditionally, cacheable memory cannot be shared between independent systems using traditional load/store (LD/ST) memory semantics. An independent system, or "node", can be independent in the sense that it functions as a single logical entity, is controlled by a single operating system (and/or single BIOS or Virtual Machine Monitor (VMM)), and/or has an independent fault domain. A single node can include one or multiple processor devices, be implemented on a single board or multiple boards, and include local memory, including cacheable memory that can be accessed using LD/ST semantics by the devices on the same node. Within a node, shared memory can include one or more blocks of memory, such as a random access memory (RAM), that can be accessed by several different processors (e.g., central processing units (CPUs)) within a node. Shared memory can also include the local memory of the processors or other devices in the node. The multiple devices within a node having shared memory can share a single view of data within the shared memory. I/O communication involving shared memory can be very low latency and allow quick access to the memory by the multiple processors.

Traditionally, memory sharing between different nodes has not allowed memory sharing according to a load/store paradigm. For instance, in some systems, memory sharing between different nodes has been facilitated through distributed memory architectures. In traditional solutions, computational tasks operate on local data, and if data of another node is desired, the computational task (e.g., executed by another CPU node) communicates with the other node, for instance, over a communication channel utilizing a communication protocol stack, such as Ethernet, InfiniBand, or another layered protocol. In traditional multi-node systems, the processors of different nodes do not have to be aware where data resides. Sharing data using traditional approaches, such as over a protocol stack, can have a significantly higher latency than memory sharing within a node using a load/store paradigm. Rather than directly addressing and operating on data in shared memory, one node can request data from another using an existing protocol handshake such as Ethernet (or Infiniband), and the source node can provide the data, such that the data can be stored and operated on by the requesting node, among other examples.

In some implementations, a shared memory architecture can be provided that allows memory to be shared between independent nodes for exclusive or shared access using load/store (LD/ST) memory semantics. In one example, memory semantics (and directory information, if applicable) along with I/O semantics (for protocols such as PCIe) can be exported on either a common set of pins or a separate set of pins. In such a system, the improved shared memory architecture can each of a plurality of nodes in a system to maintain its own independent fault domain (and local memory), while enabling a shared memory pool for access by the nodes and low-latency message passing between nodes using memory according to LD/ST semantics. In some implementations, such a shared memory pool can be dynamically (or statically) allocated between different nodes. Accordingly, one can also configure the various nodes of a system into dynamically changing groups of nodes to work cooperatively and flexibly on various tasks making use of the shared memory infrastructure, for instance, as demand arises.

In some implementations, the shared memory architecture can be based on a buffered memory interface. The buffered memory interface, itself, can be based on a general purpose input/output (GPIO) interconnect interface and protocol. For instance, the physical and link layer definitions of the GPIO interconnect can also be implemented in the buffered memory protocol. Indeed, logic used to support the physical and link layers of the GPIO protocol can be reused at interfaces supporting the buffered memory protocol. The buffered memory protocol can also share message classes, such as a request, response, and writeback message class, among other examples. While opcode values within the buffered memory protocol message can be interpreted differently than in the GPIO protocol, the same general packet and flit formats can be utilized in both the buffered memory protocol and the GPIO interconnect upon which it is built.

Figure 6:
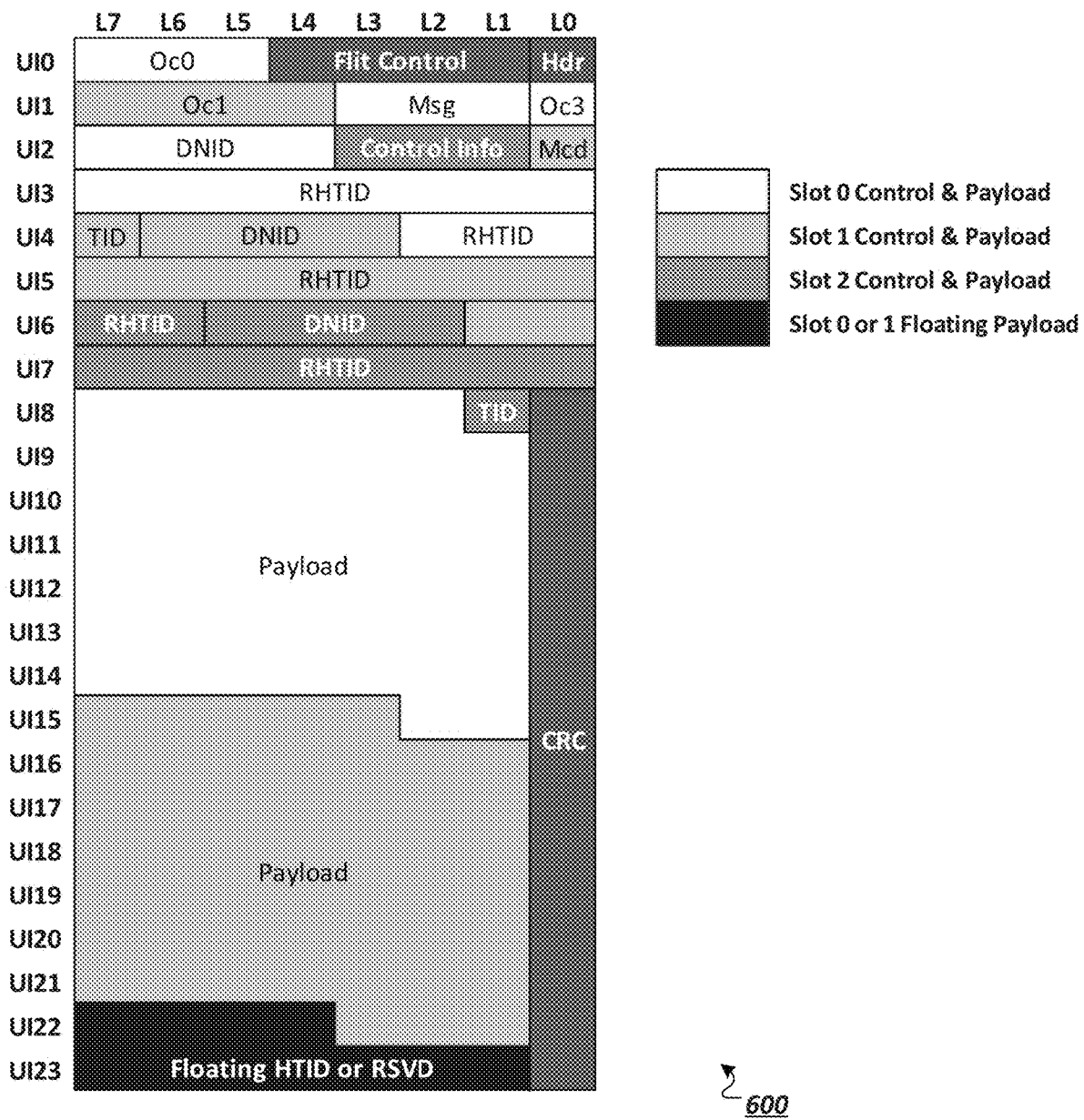
FIG. 6 illustrates a representation of an example multi-slot flit.

In one example, a flit format can be defined for flits to be sent between agents in the GPIO protocol. FIG. 6 illustrates a representation 600 of a generalized flit for an 8 lane link width. Each column of the representation 600 can symbolize a link lane and each row a respective UI. In some implementations, a single flit can be subdivided into two or more slots. Distinct messages or link layer headers can be included in each slot, allowing multiple distinct, and in some cases, independent messages corresponding to potentially different transactions to be sent in a single flit. Further, the multiple messages included in slots of a single flit may also be destined to different destination nodes, among other examples. For instance, the example of FIG. 6 illustrates a flit format with three slots. The shaded portions can represent the portion of the flit included in a respective slot.

In the example of FIG. 6, three slots, Slots 0, 1, and 2, are provided. Slot 0 can be provided 72 bits of flit space, of which 22 bits are dedicated to message header fields and 50 bits to message payload space. Slot 1 can be provided with 70 bits of flit space, of which 20 bits are dedicated to message header fields and 50 bits to message payload space. The difference in message header field space between can be optimized to provide that certain message types will be designated for inclusion in Slot 0 (e.g., where more message header encoding is utilized). A third slot, Slot 2, can be provided that occupies substantially less space than Slots 0 and 1, in this case utilizing 18 bits of flit space. Slot 2 can be optimized to handle those messages, such as acknowledges, credit returns, and the like that do no utilize larger message payloads. Additionally, a floating payload field can be provided that allows an additional 11 bits to be alternatively applied to supplement the payload field of either Slot 0 or Slot 1.

Continuing with the specific example of FIG. 6, other fields can be global to a flit (i.e., apply across the flit and not to a particular slot). For instance, a header bit can be provided together with a 4-bit flit control field that can be used to designate such information as a virtual network of the flit, identify how the flit is to be encoded, among other examples. Additionally, error control functionality can be provided, such as through a 16-bit cyclic CRC field, among other potential examples.

A flit format can be defined so as to optimize throughput of messages on the Link layer. Some traditional protocols have utilized unslotted, smaller flits. For instance, in QPI an 80-bit flit was utilized. While the flit throughput of a larger (e.g., 192-bit flit) may be lower, message or packet throughput can be increased by optimizing use of the flit data. For instance, in some protocols, an entire flit space (e.g., 80-bit) was utilized regardless of the message size or type. By subdividing a larger flit into slots of predetermined lengths and fields, the 192 flit length can be optimized realizing higher efficiency even in instances when one or more of the available slots are sometimes unused. Indeed, Link layer traffic can be assumed to include many different types of messages and traffic, including messages and packets with varying header lengths and fields. The respective lengths and organization of slots defined in a flit can be defined so as to correspond with the statistical or expected frequency of various messages and the needs of these messages. For instance, two larger slots can be defined for every small slot, to accommodate an expected statistical frequency of messaging using these larger message types and header lengths, among other example. Further, flexibility can also be provided to further accommodate the varied traffic, such as through a floating payload field, as in the example of FIG. 6. In some instances, a flit format can be fixed, including the bits dedicated to particular slots in the flit.

In the example of FIG. 6, a "Hdr" field can be provided for the flit generally and represent a header indication for the flit. In some instances, the Hdr field can indicate whether the flit is a header flit or a data flit. In data flits, the flit can still remain slotted, but omit or replace the use of certain fields with payload data. In some cases, data fields may include an opcode and payload data. In the case of header flits, a variety of header fields can be provided. In the example of FIG. 6, "Oc" fields can be provided for each slot, the Oc field representing an opcode. Similarly, one or more slots can have a corresponding "msg" field representing a message type of the corresponding packet to be included in the slot, provided the slot is designed to handle such packet types, etc. "DNID" fields can represent a Destination Node ID, a "TID" field can represent a transaction or tracker ID, a "RHTID" field can represent either a requestor node ID or a home tracker ID, among other potential fields. Further, one or more slots can be provided with payload fields. Additionally, a CRC field can be included within a flit to provide a CRC value for the flit, among other examples.

Figure 7:
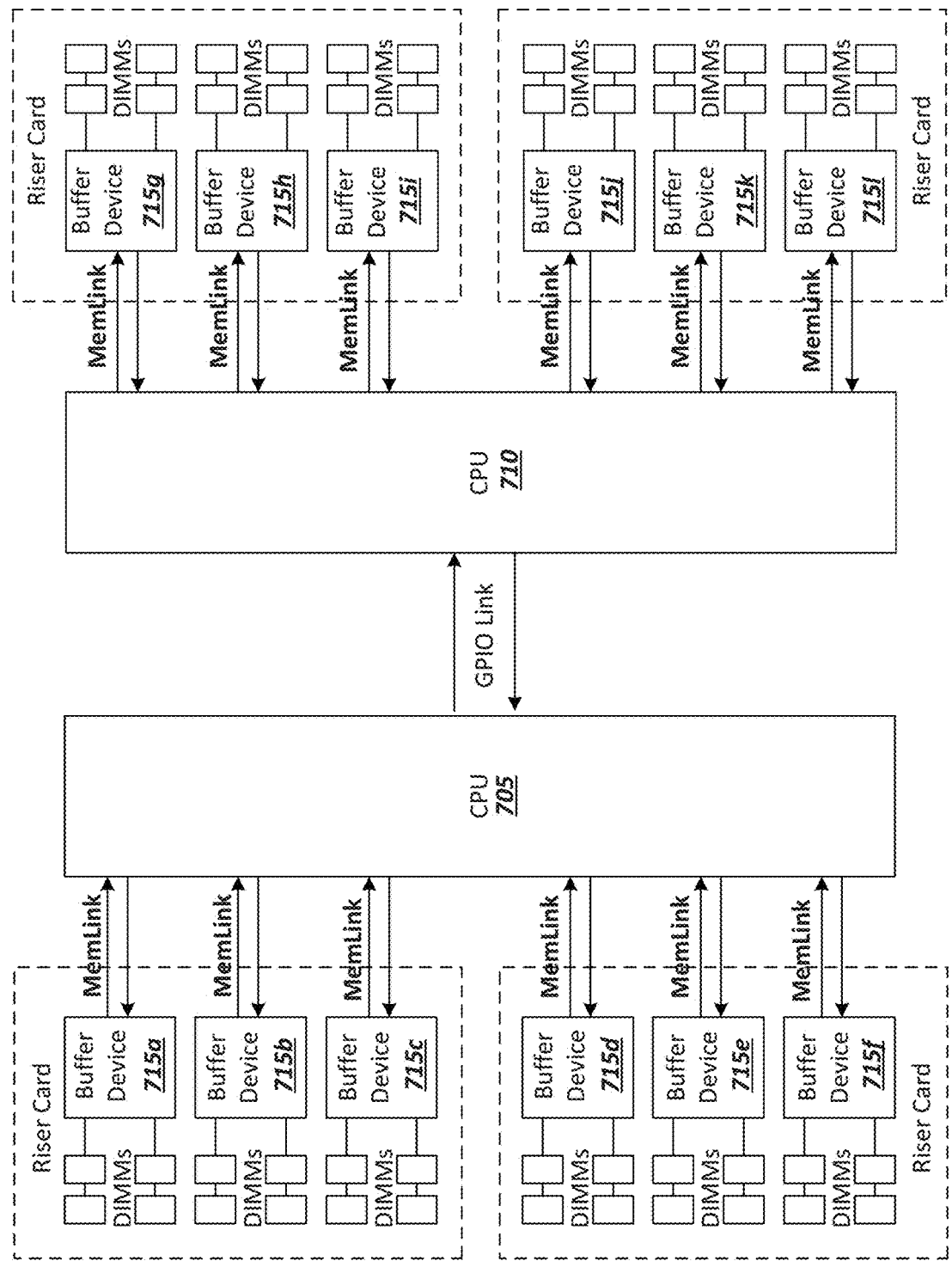
FIG. 7 illustrates an example system utilizing buffered memory access.

The multi-slotted flit of a GPIO protocol can be reused by a buffered memory protocol. FIG. 7 shows a simplified block diagram 700 illustrating an example topology of a computing system including CPU devices 705, 710 interconnected by an GPIO interconnect link. Each CPU 705, 710 can be likewise connected to one or more respective buffer devices 715a-1 using corresponding buffered memory protocol links ("MemLink"). Each buffer device can implement a memory controller for system memory of the system. As noted above, in some implementations, the buffered memory protocol interconnect can be based on the GPIO protocol, in that the physical and link layers of the buffered memory protocols are based on the same physical and link layer definitions of the GPIO protocol. Although not illustrated in FIG. 7, the CPUs 705, 710 can be further connected to one or more downstream devices using the GPIO protocol.

As further shown in the example of FIG. 7, buffer devices 715a-1 can be connected to memory devices, such as dual in-line memory module (DIMM) devices. The memory corresponding to each buffer device can be considered local to the CPU (e.g., 705, 701) to which the buffer device is connected. However, other devices (including the other CPU) can access the memory by other sockets using GPIO protocol-compliant links. In some implementations, a port running the buffered memory protocol may only support the commands for communicating with the memory and only support the buffered memory protocol (i.e., not the GPIO protocol and the buffered memory protocol). Additionally, in some implementations, the GPIO interconnect protocol may support routing and indicate such information (e.g., in its packets) such as the requesting and destination node identifiers. The buffered memory protocol, on the other hand, may be a point-to-point interface that does not utilize routing. Consequently, some fields used in the GPIO protocol may be dispensed with in packets sent using the buffered memory interfaces. Instead, fields can be designated for use in carrying address decode information host to buffer, among other examples.

In further implementations, buffer devices 715a-1 can support a two level memory topology with some amount of fast memory (e.g., DRAM) serving as a cache for a larger, slower memory (e.g., non-volatile memory). In one such implementation, one or more of the buffer devices 715a-1 can use DDR as near, fast memory and transactional DDR DIMMs as the larger "far" memory, among other examples. Transactional DIMMs can utilize protocols (e.g., DDR-Transactional (DDR-T)) to communicate to a volatile memory single in-line memory module (SIMM) using transactional commands.

Figure 8A:
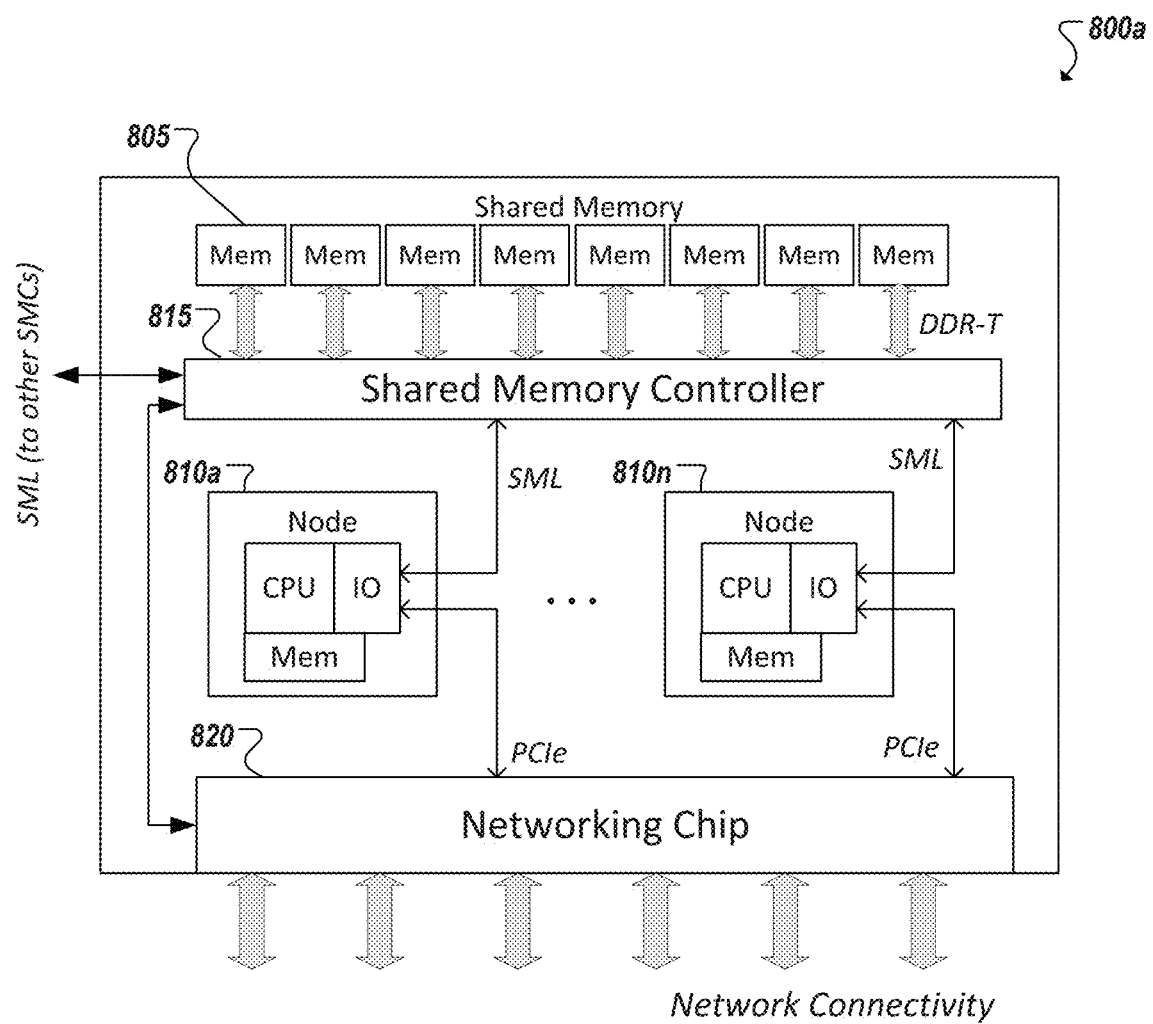
FIG. 8A illustrates a simplified block diagram of an embodiment of an example node.

The buffered memory protocol and systems utilizing a buffered memory protocol (such as those illustrated above) can be extended to enable a shared memory architecture that allows memory to be shared between independent nodes for exclusive or shared access using load/store (LD/ST) memory semantics. Turning to FIG. 8A, a simplified block diagram 800a is shown illustrating an example system including shared memory 805 capable of being accessed using load/store techniques by each of a plurality of independent nodes 810a-810n. For instance, a shared memory controller 815 can be provided that can accept load/store access requests of the various nodes 810a-810n on the system. Shared memory 805 can be implemented utilizing synchronous dynamic random access memory (SDRAM), dual in-line memory modules (DIMM), and other non-volatile memory (or volatile memory).

Each node may itself have one or multiple CPU sockets and may also include local memory that remains insulated from LD/ST access by other nodes in the system. The node can communicate with other devices on the system (e.g., shared memory controller 815, networking controller 820, other nodes, etc.) using one or more protocols, including PCIe, QPI, Ethernet, among other examples. In some implementations, a shared memory link (SML) protocol can be provided through which low latency LD/ST memory semantics can be supported. SML can be used, for instance, in communicating reads and writes of shared memory 805 (through shared memory controller 815) by the various nodes 810a-810n of a system.

In one example, SML can be based on a memory access protocol, such as Scalable Memory Interconnect (SMI) 3rd generation (SMI3). Other memory access protocols can be alternatively used, such as transactional memory access protocols such as fully buffered DIMM (FB-DIMM), DDR Transactional (DDR-T), among other examples. In other instances, SML can be based on native PCIe memory read/write semantics with additional directory extensions. A memory-protocol-based implementation of SML can offer bandwidth efficiency advantages due to being tailored to cache line memory accesses. While high performance inter-device communication protocols exist, such as PCIe, upper layers (e.g., transaction and link layers) of such protocols can introduce latency that degrades application of the full protocol for use in LD/ST memory transactions, including transactions involving a shared memory 805. A memory protocol, such as SMI3, can allow a potential additional advantage of offering lower latency accesses since it can bypass most of another protocol stack, such as PCIe. Accordingly, implementations of SML can utilize SMI3 or another memory protocol running on a logical and physical PHY of another protocol, such as SMI3 on PCIe.

As noted, in some implementation, a shared memory controller (SMC) 815 can be provided that includes logic for handling load/store requests of nodes 810a-810n in the system. Load/store requests can be received by the SMC 815 over links utilizing SML and connecting the nodes 810a-810n to the SMC 815. In some implementations the SMC 815 can be implemented as a device, such as an application-specific integrated circuit (ASIC), including logic for servicing the access requests of the nodes 810a-810n for shared memory resources. In other instances, the SMC 815 (as well as shared memory 805) can reside on a device, chip, or board separate from one or more (or even all) of the nodes 810a-810n. The SMC 815 can further include logic to coordinate various nodes' transactions that involve shared memory 805. Additionally, the SMC can maintain a directory tracking access to various data resources, such as each cache line, included in shared memory 805. For instance, a data resource can be in a shared access state (e.g., capable of being accessed (e.g., loaded or read) by multiple processing and/or I/O devices within a node, simultaneously), an exclusive access state (e.g., reserved exclusively, if not temporarily, by a single processing and/or I/O device within a node (e.g., for a store or write operation), an uncached state, among other potential examples. Further, while each node may have direct access to one or more portions of shared memory 805, different addressing schemes and values may be employed by the various nodes (e.g., 810a-810n) resulting in the same shared memory data being referred to (e.g., in an instruction) by a first node according to a first address value and a second node being referring to the same data by a second address value. The SMC 815 can include logic, including data structures mapping nodes' addresses to shared memory resources, to allow the SMC 815 to interpret the various access requests of the various nodes.

Additionally, in some cases, some portion of shared memory (e.g., certain partitions, memory blocks, records, files, etc.) may be subject to certain permissions, rules, and assignments such that only a portion of the nodes 810a-810n are allowed (e.g., by the SMC 815) to access the corresponding data. Indeed, each shared memory resource may be assigned to a respective (and in some cases different) subset of the nodes 810a-810n of the system. These assignments can be dynamic and SMC 815 can modify such rules and permissions (e.g., on-demand, dynamically, etc.) to accommodate new or changed rules, permissions, node assignments and ownership applicable to a given portion of the shared memory 805.

An example SMC 815 can further track various transactions involving nodes (e.g., 810a-810n) in the system accessing one or more shared memory resources. For instance, SMC 815 can track information for each shared memory 805 transaction, including identification of the node(s) involved in the transaction, progress of the transaction (e.g., whether it has been completed), among other transaction information. This can permit some of the transaction-oriented aspects of traditional distributed memory architectures to be applied to the improved multi-node shared memory architecture described herein. Additionally, transaction tracking (e.g., by the SMC) can be used to assist in maintaining or enforcing the distinct and independent fault domains of each respective node. For instance, the SMC can maintain the corresponding Node ID for each transaction-in-progress in its internal data structures, including in memory, and use that information to enforce access rights and maintain individual fault-domains for each node. Accordingly, when one of the nodes goes down (e.g., due to a critical error, triggered recovery sequence, or other fault or event), only that node and its transactions involving the shared memory 805 are interrupted (e.g., dumped by the SMC)—transactions of the remaining nodes that involve the shared memory 805 continue on independent of the fault in the other node.

A system can include multiple nodes. Additionally, some example systems can include multiple SMCs. In some cases, a node may be able to access shared memory off a remote SMC to which it is not directly attached to (i.e., the node's local SMC connects to the remote SMC through one or multiple SML Link hops). The remote SMC may be in the same board or could be in a different board. In some cases, some of the nodes may be off-system (e.g., off board or off chip) but nonetheless access shared memory 805. For instance, one or more off-system nodes can connect directly to the SMC using an SML-compliant link, among other examples. Additionally, other systems that include their own SMC and shared memory can also connect with the SMC 810 to extend sharing of memory 805 to nodes included, for instance, on another board that interface with the other SMC connected to the SMC over an SML link. Still further, network connections can be tunneled through to further extend access to other off-board or off-chip nodes. For instance, SML can tunnel over an Ethernet connection (e.g., provided through network controller 820) communicatively coupling the example system of FIG. 8A with another system that can also include one or more other nodes and allow these nodes to also gain access to SMC 815 and thereby shared memory 805, among other examples.

Figure 8B:
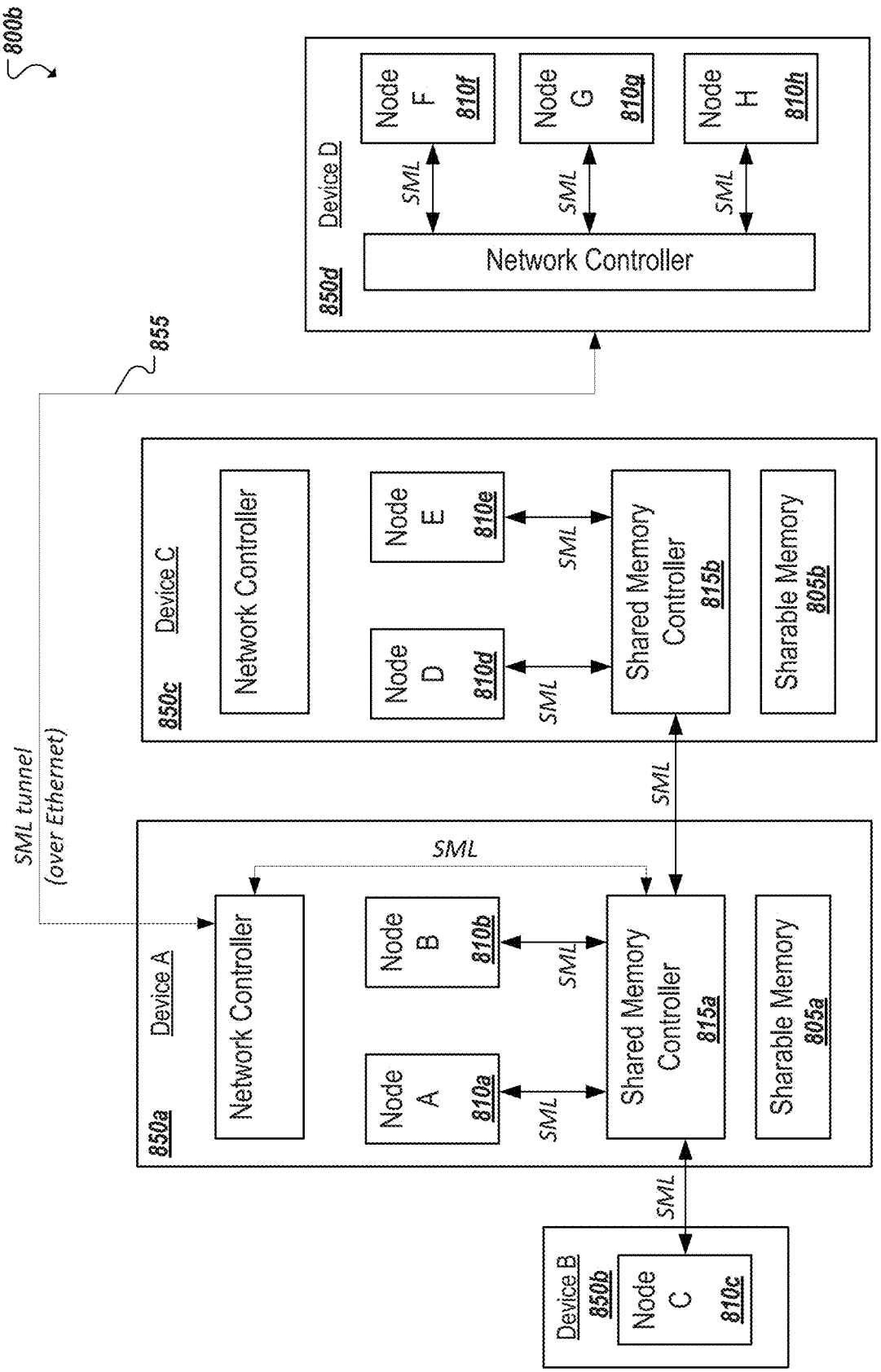
FIG. 8B illustrates a simplified block diagram of an embodiment of an example system including a plurality of nodes.

As another example, as shown in the simplified block diagram 800b of FIG. 8B, an improved shared memory architecture permitting shared access by multiple independent nodes according to a LD/ST memory semantic can flexibly allow for the provision of a variety of different multi-node system designs. Various combinations of the multiple nodes can be assigned to share portions of one or more shared memory blocks provided in an example system. For instance, another example system shown in the example of FIG. 8B, can include multiple devices 850a-850d implemented, for instance, as separate dies, boards, chips, etc., each device including one or more independent CPU nodes (e.g., 810a-810h). Each node can include its own local memory. One or more of the multiple devices 850a-850d can further include shared memory that can be accessed by two or more of the nodes 810a-810h of the system.

The system illustrated in FIG. 8B is an example provided to illustrate some of the variability that can be realized through an improved shared memory architecture, such as shown and described herein. For instance, each of a Device A 850a and Device C 850c can include a respective shared memory element (e.g., 805a, 805b). Accordingly, in some implementations, each shared memory element on a distinct device may further include a respective shared memory controller (SMC) 815a, 815b. Various combinations of nodes 810a-810h can be communicatively coupled to each SMC (e.g., 815a, 815b) allowing the nodes to access the corresponding shared memory (e.g., 805a, 805b). As an example, SMC 815a of Device A 850a can connect to nodes 810a, 810b on Device A using a direct data link supporting SML. Additionally, another node 810c on another device (e.g., Device C 850c) can also have access to the shared memory 805a by virtue of a direct, hardwired connection (supporting SML) from the node 810c (and/or its device 850c) to SMC 815a. Indirect, network-based, or other such connections can also be used to allow nodes (e.g., 810f-810h) of a remote or off-board device (e.g., Device D 850d) to utilize a conventional protocol stack to interface with SMC 815a to also have access to shared memory 805a. For instance, an SML tunnel 855 can be established over an Ethernet, InfiniB and, or other connection coupling Device A and Device D. While establishing and maintaining the tunnel can introduce some additional overhead and latency, compared to SML running on other less-software-managed physical connections, the SML tunnel 855 when established can operate as other SML channels and allow the nodes 810f-810h to interface with SMC 815a over SML and access shared memory 805a as any other node communicating with SMC over an SML link can. For instance, reliability and ordering of the packets in the SML channels can be enforced either by the networking components in the system or it can be enforced end-to-end between the SMCs.

In still other examples, nodes (e.g., 815d, 815e) on a device different from that hosting a particular portion of shared memory (e.g., 805a) can connect indirectly to the corresponding SMC (e.g., SMC 815a) by connecting directly to another SMC (e.g., 815b) that is itself coupled (e.g., using an SML link) to the corresponding SMC (e.g., 815a). Linking two or more SMCs (e.g., 815a, 815b) can effectively expand the amount of shared memory available to the nodes 810a-810h on the system. For instance, by virtue of a link between SMCs 815a, 815b in the example of FIG. 8B, in some implementations, any of the nodes (e.g., 810a-810c, 810f-810h) capable of accessing shared memory 805a through SMC 815a may also potentially access sharable memory 805b by virtue of the connection between SMC 815a and SMC 815b. Likewise, in some implementations, each of the nodes directly accessing SMC 815b can also access sharable memory 805a by virtue of the connection between the SMCs 815a, 815b, among other potential examples.

As noted, independent nodes can each access shared memory, including shared memory included in memory not connected to the SMC to which the node is directly connected. The shared memory is effectively pooled. While a traditional buffered memory protocol can assume point-to-point communication, the pooling of shared memory and joint management of this memory by multiple SMCs can involve packets and flits relating to this memory to traverse multiple hops and SMCs before they arrive to their intended destination. In this respect, the multiple SMCs can form a network of SMCs and each SMC can include logic for determining how to route a particular flit from its directly connected nodes to the SMC connected to the memory addressed by the flit. For instance, in FIG. 8C, an example 800c is shown of multiple SMCs 815a-c interconnected with each other SMC by one or more SML links. Each SMC can be connected to a subset of the processor nodes in the system. Further, each SMC can directly connect to and provide access to a respective subset of the memory elements that compose the shared memory pool. As an example, SMC 815a can connect to nodes 810a, 810b and shared memory elements (e.g., 805a). Another node 810i can access a line of memory stored in shared memory portion 805a by sending a request to SMC 815c which can route the request, over an SML link to SMC 815a. SMC 815a can manage a memory action in connection with the request and respond, in some cases, by providing read data, an acknowledgement, or other information to the node 810i by routing the response over an SML link to SMC 815c. Instead of routing SML communications directly between SMC 815a and 815c, in other instances, the communications can additionally be routed over other SMCs (e.g., 815b). Accordingly, each SMC in a shared memory architecture can include routing logic, implemented in hardware and/or software to facilitate routing communications between SMCs within the network.

As noted above, an improved shared memory architecture can include a low-latency link protocol (i.e., SML) based on a memory access protocol, such as SMI3, and provided to facilitate load/store requests involving the shared memory. Whereas traditional SMI3 and other memory access protocols may be configured for use in memory sharing within a single node, SML can extend memory access semantics to multiple nodes to allow memory sharing between the multiple nodes. Further, SML can potentially be utilized on any physical communication link. SML can utilize a memory access protocol supporting LD/ST memory semantics that is overlaid on a physical layer (and corresponding physical layer logic) adapted to interconnect distinct devices (and nodes). Additionally, physical layer logic of SML can provide for no packet dropping and error retry functionality, among other features.

In some implementations, SML can be can be implemented by overlaying SMI3 on a PCIe PHY. An SML link layer can be provided (e.g., in lieu of a traditional PCIe link layer) to forego flow control and other features and facilitate lower latency memory access such as would be characteristic in traditional CPU memory access architectures. In one example, SML link layer logic can multiplex between shared memory transactions and other transactions. For instance, SML link layer logic can multiplex between SMI3 and PCIe transactions. For instance, SMI3 (or another memory protocol) can overlay on top of PCIe (or another interconnect protocol) so that the link can dynamically switch between SMI3 and PCIe transactions. This can allow traditional PCIe traffic to effectively coexist on the same link as SML traffic in some instances.

Figure 9:
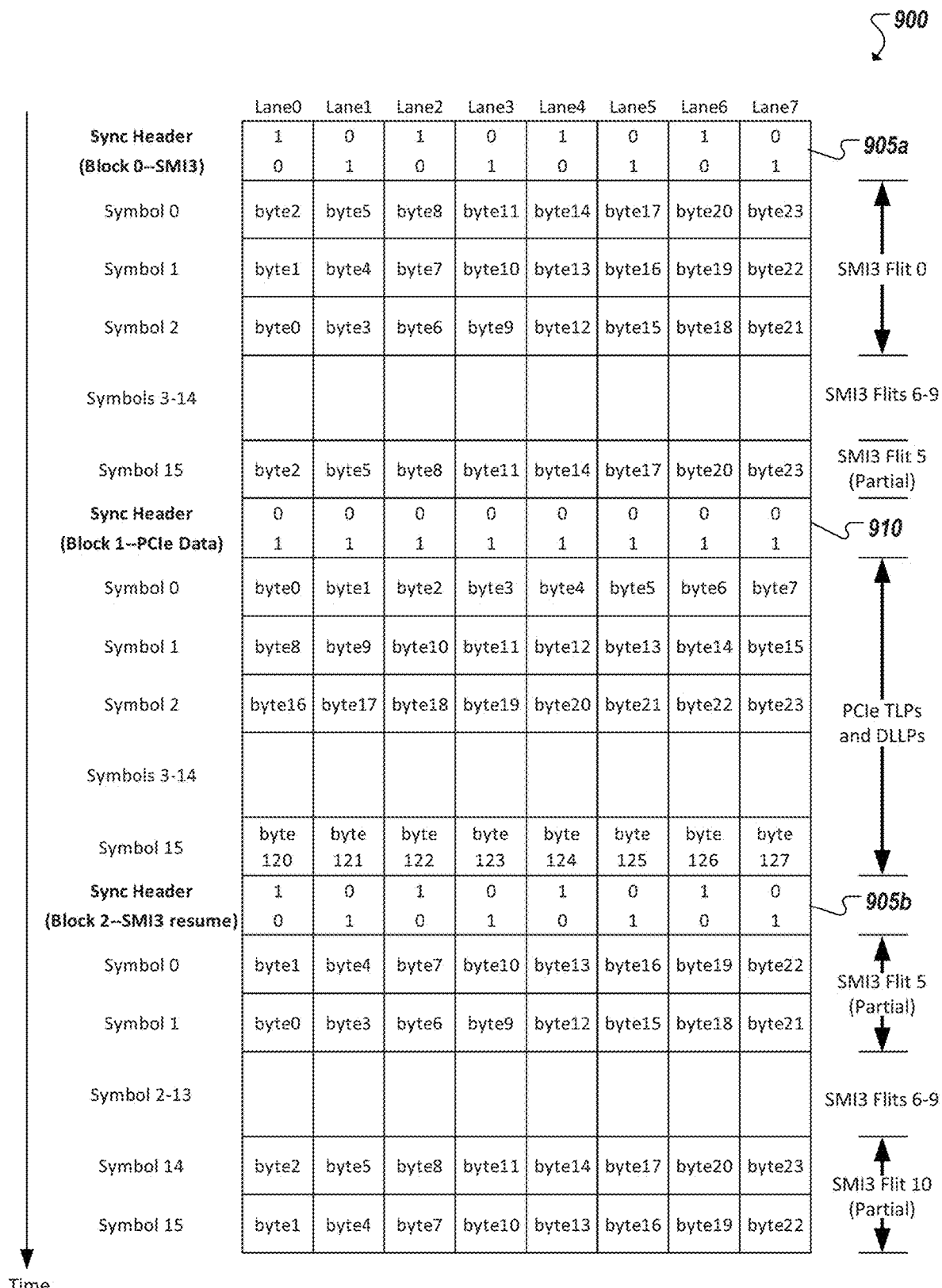
FIG. 9 is a representation of data transmitted according to an example shared memory link.

Turning to FIG. 9, a representation 900 is shown illustrating a first implementation of SML. For instance, SML can be implemented by overlaying SMI3 on a PCIe PHY. The physical layer can use standard PCIe 128b/130b encoding for all physical layer activities including link training as well as PCIe data blocks. SML can provide for traffic on the lanes (e.g., Lane0-Lane7) of the link to be multiplexed between PCIe packets and SMI3 flits. For example, in the implementation illustrated in FIG. 9, the sync header of the PCIe 128b/130b encoding can be modified and used to indicate that SMI3 flits are to be sent on the lanes of the link rather than PCIe packets. In traditional PCIe 128b/130b encoding, valid sync headers (e.g., 910) can include the sending of either a 10b pattern on all lanes of the link (to indicate that the type of payload of the block is to be PCIe Data Block) or a 01b pattern on all lanes of the link (to indicate that the type of payload of the block is to be PCIe Ordered Set Block). In an example of SML, an alternate sync header can be defined to differentiate SMI3 flit traffic from PCIe data blocks and ordered sets. In one example, illustrated in FIG. 9, the PCIe 128b/130b sync header (e.g., 905a, 905b) can be encoded with alternating 01b, 10b patterns on odd/even lanes to identify that SMI3 flits are to be sent. In another alternative implementation, the 128b/130b sync header encoding for SMI3 traffic can be defined by alternating 10b, 01b patterns on odd/even lanes, among other example encodings. In some cases, SMI3 flits can be transmitted immediately following the SMI3 sync header on a per-byte basis, with the transition between PCIe and SMI3 protocols taking place at the block boundary.

In some implementations, such as that illustrated in the example of FIG. 9, the transition between the protocols can be defined to take place at the block boundary irrespective of whether it corresponds to an SMI3 flit or PCIe packet boundary. For instance, a block can be defined to include a predefined amount of data (e.g., 16 symbols, 128 bytes, etc.). In such implementations, when the block boundary does not correspond to an SMI3 flit or PCIe packet boundary, the transmission of an entire SMI3 flit may be interrupted. An interrupted SMI3 flit can be resumed in the next SMI3 block indicated by the sending of another sync header encoded for SMI3.

Figure 10A:
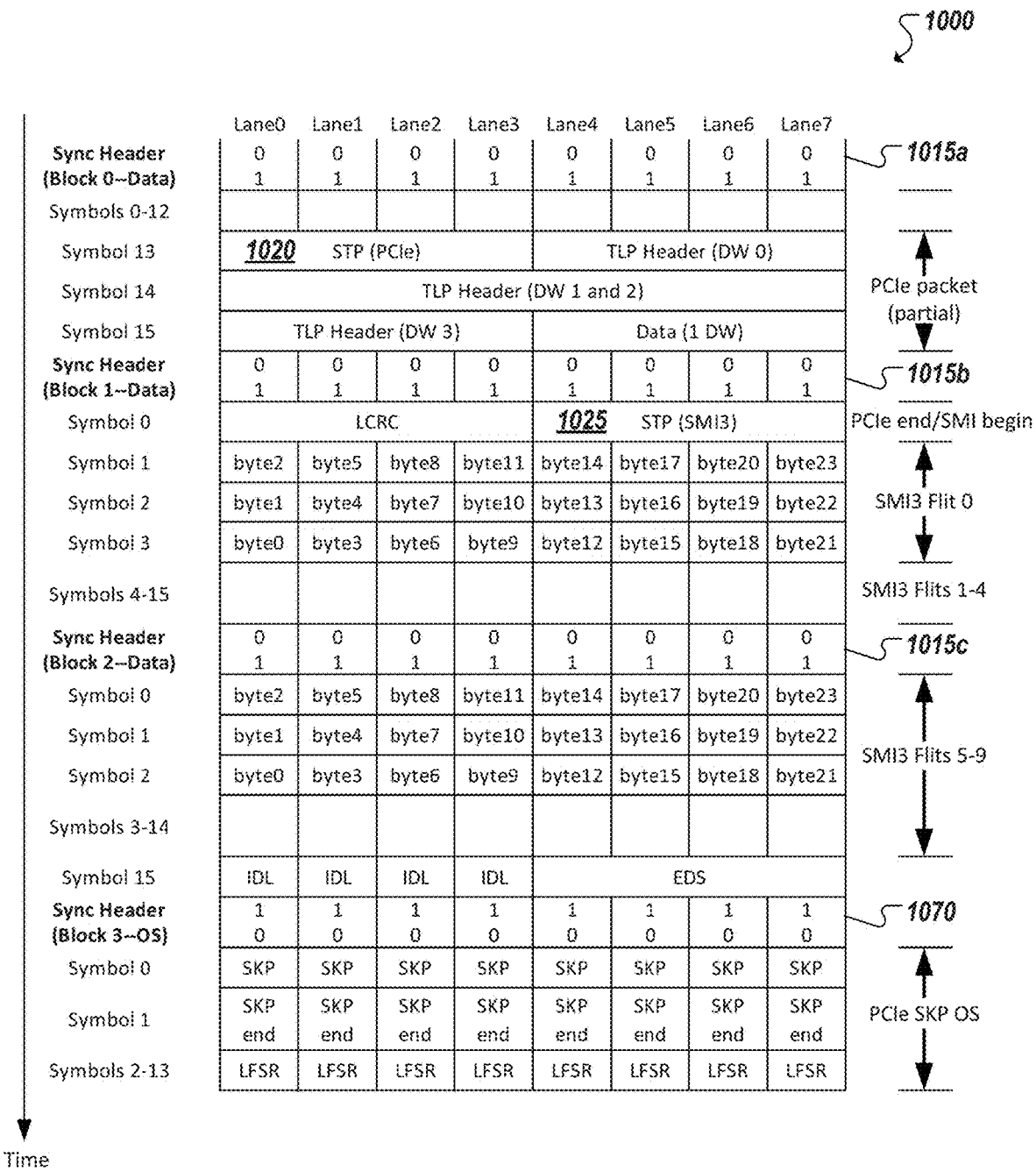
FIG. 10A is a representation of data transmitted according to another example of a shared memory link.

Turning to FIG. 10A, a representation 1000 is shown illustrating another example implementation of SML. In the example of FIG. 10A, rather than using a specialized sync header encoding to signal transitions between memory access and interconnect protocol traffic, physical layer framing tokens can be used. A framing token (or "token") can be a physical layer data encapsulation that specifies or implies the number of symbols to be included in a stream of data associated with the token. Consequently, the framing token can identify that a stream is beginning as well as imply where it will end and can therefore be used to also identify the location of the next framing token. A framing token of a data stream can be located in the first symbol (Symbol 0) of the first lane (e.g., Lane 0) of the first data block of the data stream. In the example of PCIs, five framing tokens can be defined, including start of TLP traffic (STP) token, end of data stream (EDS) token, end bad (EDB) token, start of DLLP (SDP) token, and logical idle (IDL) token.

Figure 10B:
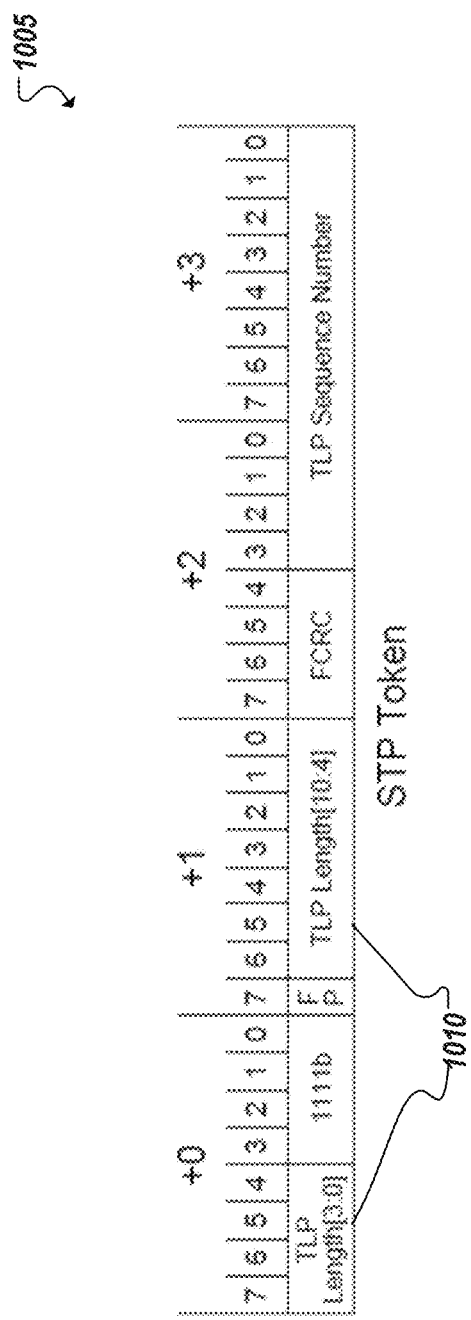
FIG. 10B is a representation of an example start of data framing token.

In the example of FIG. 10A, SML can be implemented by overlaying (or "tunneling") SMI3 or another data access protocol on PCIe and the standard PCIe STP token can be modified to define a new STP token that identifies that SMI3 (instead of TLP traffic) is to commence on the lanes of the link. In some examples, values of reserve bits of the standard PCIe STP token can be modified to define the SMI3 STP token in SML. Further, as shown in FIG. 10B, an STP token 1005 can include several fields, including a 1010 field that identifies the length of the SMI3 payload (in terms of the number of flits) that is to follow. In some implementations, one or more standard payload lengths can be defined for TLP data. SMI3 data can, in some implementations, be defined to include a fixed number of flits, or in other cases, may have variable numbers of flits in which case the length field for the number of SMI3 flits becomes a field that can be disregarded. Further, the length field for an SMI3 STP can be defined as a length other than one of the defined TLP payload lengths. Accordingly, an SMI3 STP can be identified based on a non-TLP length value being present in the STP length field, as one example. For example, in one implementation, the upper 3-bits of the 11-bit STP length field can be set to 111b to indicate the SMI3 packet (e.g., based on the assumption that no specification-compliant PCIe TLP can be long enough to have a length where the upper 3 bits of the length field would result in 1's). Other implementations can alter or encode other fields of the STP token to differentiate a PCIe STP token identifying a traditional PCIe TLP data payload from a SMI3 STP token identifying that SMI3 data is encapsulated in TLP data.

Returning to the example of FIG. 10A, sync header data can follow the encoding specified for traditional PCIe 128b/130b encoding. For instance, at 1015a-c, sync headers with value 10b are received indicating that data blocks are forthcoming. When a PCIe STP (e.g., 1020) is received, a PCIe TLP payload is expected and the data stream is processed accordingly. Consistent with the payload length identified in the PCIe STP 1020, the PCIe TLP payload can utilize the full payload length allocated. Another STP token can be received essentially at any time within a data block following the end of the TLP payload. For instance, at 1025, an SMI3 STP can be received signaling a transition from PCIe TLP data to SMI3 flit data. The SMI3 STP can be sent, for instance, as soon as an end of the PCIe packet data is identified.

Continuing with the example of FIG. 10A, as with PCIe TLP data, the SMI3 STP 1025 can define a length of the SMI3 flit payload that is to follow. For instance, the payload length of the SMI3 data can correspond to the number of SMI3 flits in terms of DWs to follow. A window (e.g., ending at Symbol 15 of Lane 3) corresponding to the payload length can thereby be defined on the lanes, in which only SMI3 data is to be sent during the window. When the window concludes, other data can be sent, such as another PCIe STP to recommence sending of TLP data or other data, such as ordered set data. For instance, as shown in the example of FIG. 10A, an EDS token is sent following the end of the SMI3 data window defined by SMI3 STP token 1025. The EDS token can signal the end of the data stream and imply that an ordered set block is to follow, as is the case in the example of FIG. 10A. A sync header 1040 is sent that is encoded 01b to indicate that an ordered set block is to be sent. In this case a PCIe SKP ordered set is sent. Such ordered sets can be sent periodically or according to set intervals or windows such that various PHY-level tasks and coordination can be performed, including initializing bit alignment, initializing symbol alignment, exchanging PHY parameters, compensating for different bit rates for two communicating ports, among other examples. In some cases, a mandated ordered set can be sent to interrupt a defined window or data block specified for SMI3 flit data by a corresponding SMI3 STP token.

While not shown explicitly in the example of FIG. 10A, an STP token can also be used to transition from SMI3 flit data on the link to PCIe TLP data. For instance, following the end of a defined SMI3 window, a PCIe STP token (e.g., similar to token 1020) can be sent to indicate that the next window is for the sending of a specified amount of PCIe TLP data.

Memory access flits (e.g., SMI3 flits) may vary in size in some embodiments, making it difficult to predict, a priori, how much data to reserve in the corresponding STP token (e.g., SMI3 STP token) for the memory access payload. As an example, as shown in FIG. 10, SMI3 STP 1025 can have a length field indicating that 244 bytes of SMI3 data is to be expected following the SMI3 STP 1025. However, in this example, only ten flits (e.g., SMI3 Flits 0-9) are ready to be sent during the window and these ten SMI3 flits only utilize 240 of the 244 bytes. Accordingly, four (4) bytes of empty bandwidth is left, and these are filled with IDL tokens. This can be particularly suboptimal when PCIe TLP data is queued and waiting for the SMI3 window to close. In other cases, the window provided for the sending of SMI3 flits may be insufficient to send the amount of SMI3 data ready for the lane. Arbitration techniques can be employed to determine how to arbitrate between SMI3 and PCIe TLP data coexisting on the link. Further, in some implementations, the length of the SMI3 windows can be dynamically modified to assist in more efficient use of the link. For instance, arbitration or other logic can monitor how well the defined SMI3 windows are utilized to determine whether the defined window length can be better optimized to the amount of SMI3 (and competing PCIe TLP traffic) expected for the lane. Accordingly, in such implementations, the length field values of SMI3 STP tokens can be dynamically adjusted (e.g., between different values) depending on the amount of link bandwidth that SMI3 flit data should be allocated (e.g., relative to other PCIe data, including TLP, DLLP, and ordered set data), among other examples.

Figure 11:
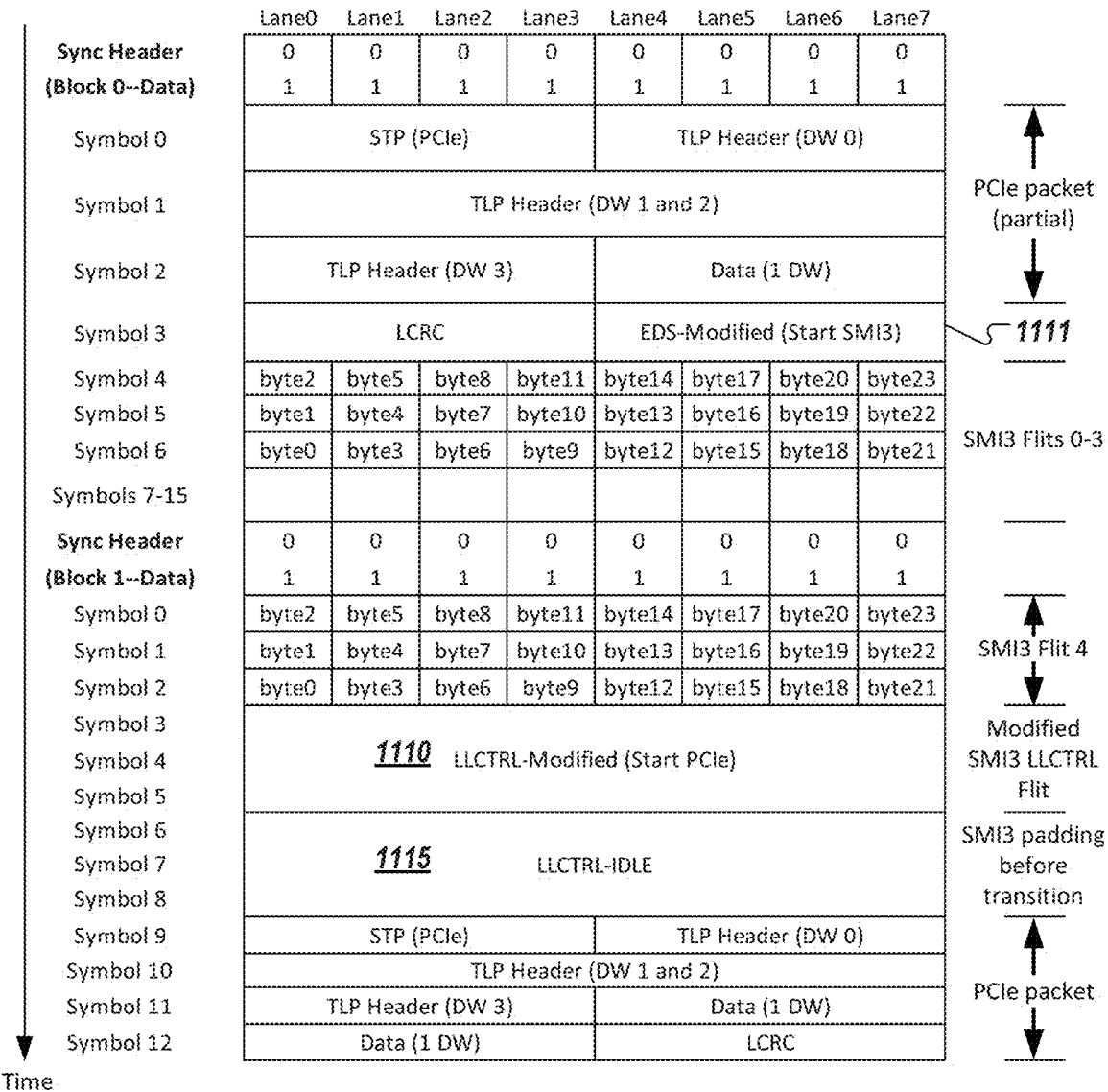
FIG. 11 is a representation of data transmitted according to another example of a shared memory link.

Turning to FIG. 11, a representation 1100 of another example implementation of SML is illustrated. In this alternative embodiment, SML can provide for interleaving SMI3 and PCIe protocols through a modified PCIe framing token. As noted above, an EDS token can be used in PCIe to indicate an end of a data stream and indicate that the next block will be an ordered set block. In the example of FIG. 11, SML can define an SMI3 EDS token (e.g., 1105) that indicates the end of a TLP data stream and the transition to SMI3 flit transmissions. An SMI3 EDS (e.g., 1105) can be defined by encoding a portion of the reserved bits of the traditional EDS token to indicate that SMI3 data is to follow, rather than PCIe ordered sets or other data that is to follow a PCIe EDS. Unlike the traditional EDS token, the SMI3 EDS can be sent at essentially anywhere within a PCIe data block. This can permit additional flexibility in sending SMI3 data and accommodating corresponding low-latency shared memory transactions. For instance, a transition from PCIe to SMI3 can be accomplished with a single double word (DW) of overhead. Further, as with traditional EDS tokens, an example SMI3 EDS may not specify a length associated with the SMI3 data that is to follow the token. Following an SMI3 EDS, PCIe TLP data can conclude and SMI3 flits proceed on the link. SMI3 traffic can proceed until SMI3 logic passes control back to PCIe logic. In some implementations, the sending of an SMI3 EDS causes control to be passed from PCIe logic to SMI3 logic provided, for instance, on devices connected on the link.

In one example, SMI3 (or another protocol) can define its own link control signaling for use in performing link layer control. For example, in one implementation, SML can define a specialized version of a SMI3 link layer control (LLCTRL) flit (e.g., 1110) that indicates a transition from SMI3 back to PCIe protocol. As with an SMI3 EDS, the defined LLCTRL flit (e.g., 1110) can cause control to be passed from SMI3 logic back to PCIe logic. In some cases, as shown in the example of FIG. 11, the defined LLCTRL flit (e.g., 1110) can be padded with a predefined number of LLCTRL idle (LLCTRL-IDLE) flits (e.g., 1115) before completing the transition to PCIe. For instance, the number of LLCTRL-IDLE flits 1115 to be sent to pad the SMI3 LLCTRL flit 1110 can depend on the latency to decode the defined SMI3 LLCTRL flit 1110 signaling the transition. After completing the transition back to PCIe, an STP packet can be sent and TLP packet data can recommence on the link under control of PCIe.

Figure 8C:
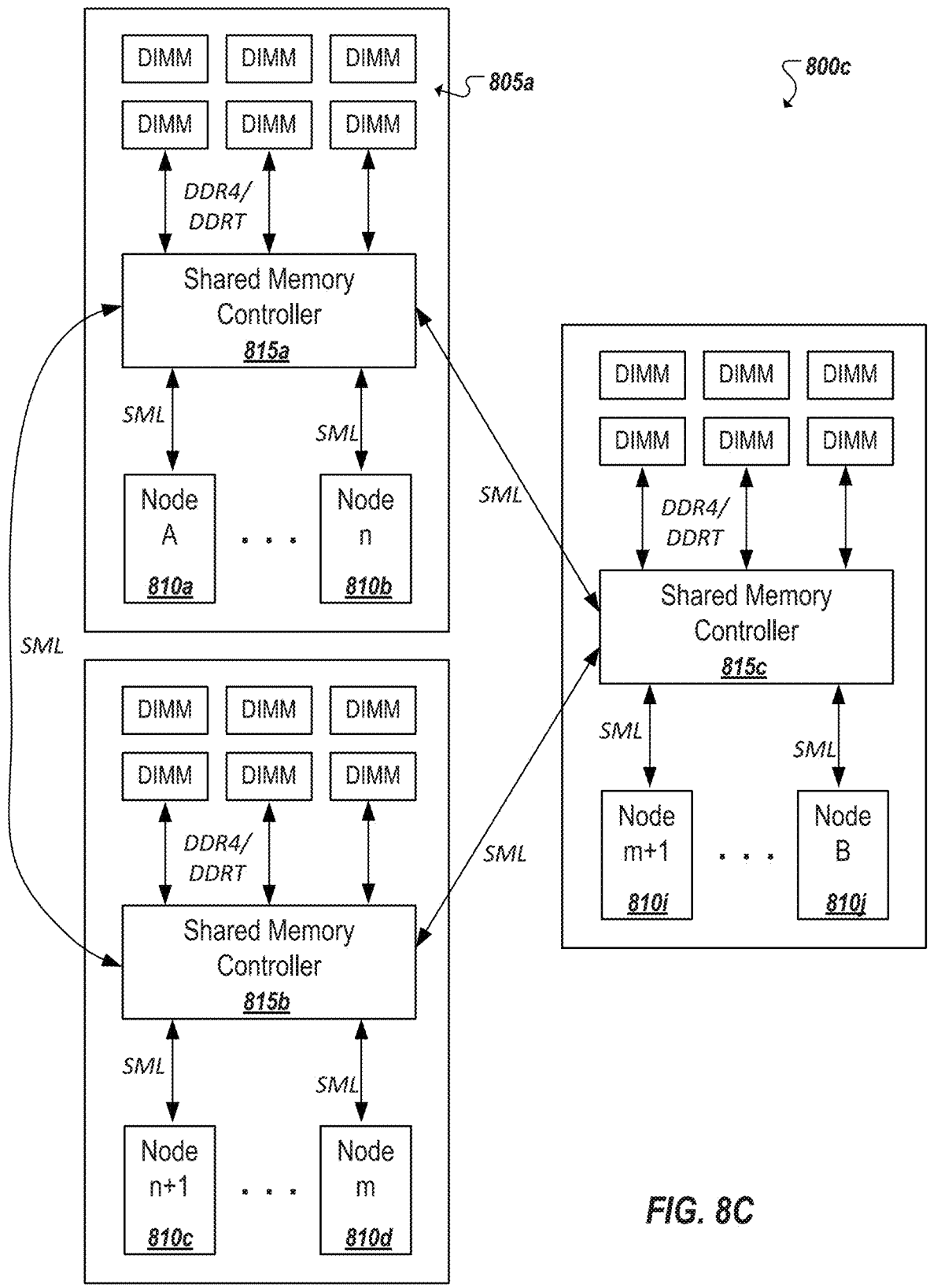
FIG. 8C illustrates another simplified block diagram of an embodiment of an example system including a plurality of nodes.

As noted in connection with the examples of FIGS. 8A-8C, shared memory controllers in a shared buffered memory architecture can include routing logic, implemented in hardware and/or software, to route communications over SML links between SMCs to facilitate data transactions involving nodes and shared memory. To facilitate routing of flits among the network of SMCs, additional fields can be provided in SML flits to assist in routing requests and responses to those requests to their appropriate destinations. Table 1 describes example fields that can be provided in a flit to accommodate routing in a multi-SMC shared memory architecture.

TABLE 1

Alternate Fields for SML Flits

| PLM Packet Field Deltas | Description |
| --- | --- |
| Source SMC Link ID[8:0] | Encodes the source SMC and internal SMC agent for a request |
| Address[59:52] | Upper bits of the global system address |
| Slot-2 Mode Bit | When set, indicates that a particular slot in a defined multi-slot flit format has been repurposed to carry some of the upper address bits. When clear, the particular slot carries information in accordance with a buffered memory link protocol. |
| Alternate Route Requested (ARR) | Specifies that a request should take an alternate route through fabric to its destination |

DIn some implementations, as introduced in Table 1, a flit can be provided with a field to indicate the source (and, in some cases, also the destination) node identifier of a given transaction. A link ID field can be encoded with bits to identify an identity of the corresponding as well as some additional bits to identify the particular link (or SMC agent) over which the request is sent/received SMC. The SMC identifier can be a unique value within the system. In instances where the link ID value is a concatenation, combination, or otherwise based on both the SMC's ID and a particular link's ID, it can be expected that the value of the link ID field is globally unique within the system. A similar field can be provided, in some implementations, to indicate the destination SMC for the request (although, in other implementations, the destination SMC may be identifiable from the memory address that is the subject of the transaction). Further, internally generated transactions by a particular SMC for events such as memory migration, reliability-, accessibility-, serviceability-(RAS) related memory read/write/flush, etc., can have one or more unique "Link numbers" even though they do not reside off an external Link. The Link ID field can be processed by a receiving SMC and interpreted to determine how to route the flit to/from its destination either locally (between nodes and SMCs that are directly connected) or over one or more additional SMCs and one or more SML "hops".

By pooling memory of multiple memory elements managed by multiple different SMCs, the size of the address space can be significantly larger than would be anticipated for point-to-point transactions between a node and a single, corresponding memory controller. For a pooled memory architecture, a larger address space can be made available to support the needs of all the nodes (e.g., in a rack or server tower), which will be the aggregated amount of memory for each node in the pool. In some cases, each node's private memory may likely reside off the SMC directly attached, this is not a requirement and portions of a node's dedicated memory as well as the shared memory could be located off a remote SMC. In some implementations, the flit format of an existing protocol can be reused and augmented to support a shared memory infrastructure. Indeed, a system may make use of the same foundational flit format for point-to-point buffered memory links and shared memory links.

Figure 12:
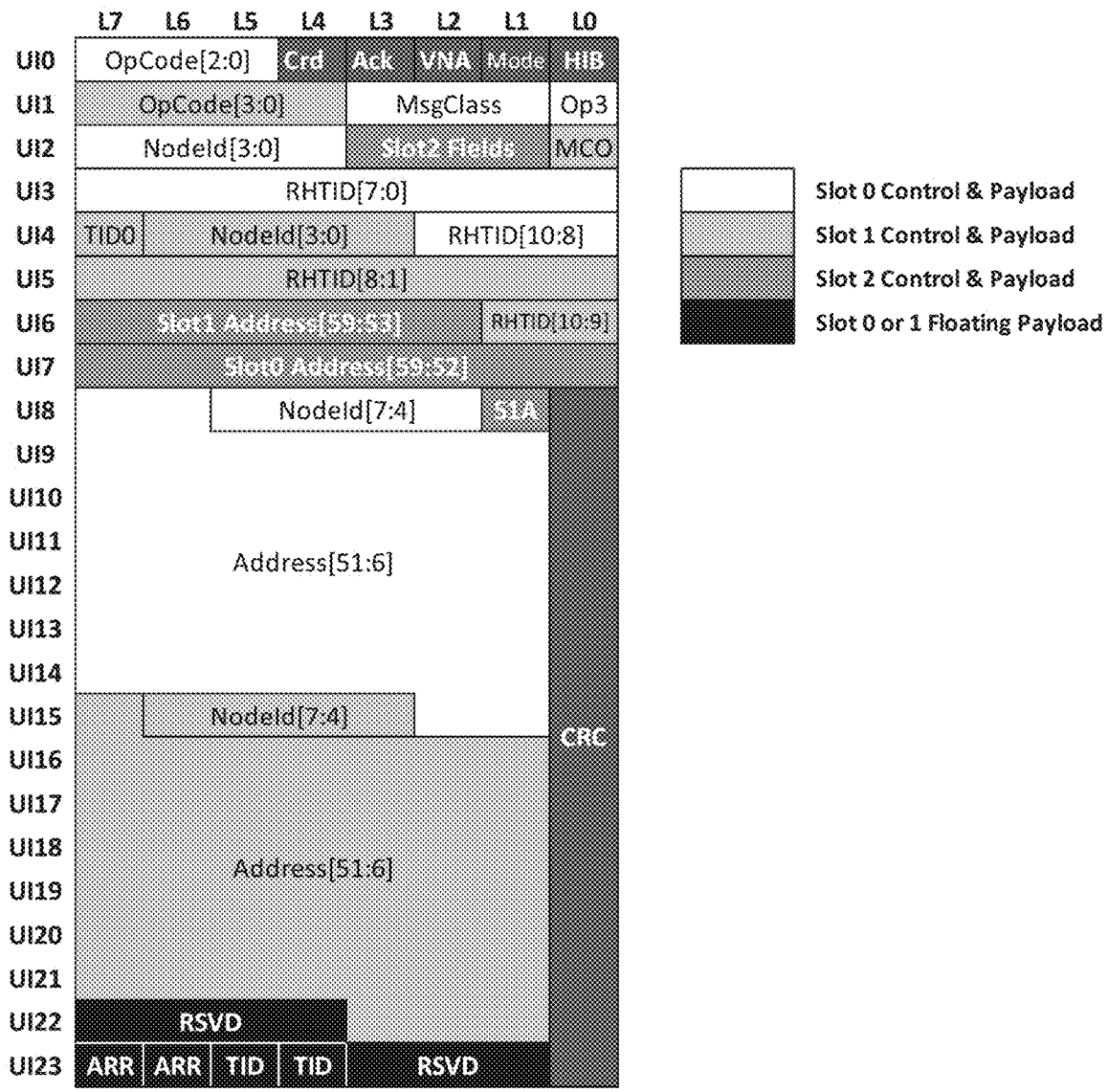
FIG. 12 illustrates a representation of an example multi-slot flit modified for routing within a shared memory architecture.

In one example, to accommodate the larger address space involved in a shared memory architecture, additional bits can be provided over and above what is provided in the defined flit header format provided for GPIO and/or standard buffered memory access transactions. For instance, a slot of a multi-slot flit can be used to encode additional address bits and extend the memory address scheme supported by the flit format (i.e., in SML transactions). For instance, FIG. 12 illustrates a representation 1200 showing an augmented version of the flit header format of an example high performance GPIO interconnect protocol, such as the example format illustrated and described in connection with FIG. 6. For a standard buffered memory link interface the payloads of Slots 0 and 1 can be used to encoded the address of the line in memory that is to be accessed in the transaction (e.g., a 64 byte cache line address). In one implementation, additional address bits can be encoded in the bits of Slot 2 (i.e., in UIs 6, 7, and 8) as the additional, or upper, address bits of the pooled memory space. This can extend the address space by eight bits Continuing with the example of FIG. 12, a three-slot flit format of the GPIO protocol introduced in FIG. 6 can be augmented with fields specific to transactions of a shared memory architecture including fields to assist in routing between multiple SMCs in this architecture. The upper address bits of the expanded memory address can also be used in lieu of the SMC number of the "Source Link ID" field, in some implementations, such as where a flat system address space exists where the upper physical address bits represents the SMC number, among other examples.

As additional examples, a flit format of a GPIO protocol or buffered memory link protocol can be augmented to accommodate additional bits to optionally indicate alternate route(s) to be taken if multiple paths exist between a source-destination pair. For instance, in the example of FIG. 12, reserved fields or a floating field provided in the header flit format of a GPIO protocol can be encoded with ARR values for each of the two transactions (in Slots 0 and 1) to indicate a particular path to take between the SMCs of the shared memory architecture. For instance, ARR values can be utilized to provide high availability within the system. For instance, an SMC, or the node to which it is connected, can detect a time-out condition for a transaction. This can prompt a re-try (e.g., after one or more failed retries using the original routing path) using an available alternate path for routing the transaction between the SMC and a destination SMC. To facilitate this, the SMC can encode bits of an ARR field for the transaction with a value to indicate the alternate path. This can allow a transaction to be retried along an alternate path(s) to recover from the errors without escalating the error to be unrecoverable (such as timeout or poison).

As noted above, a flit of a SML protocol can be based on, or be an augmented version of, a flit with a base format defined by another interconnect protocol (e.g., another protocol used in the system). In some instances, the modifications to the base format can be selectable, in that the original, base flit/packet layout (of the other protocol) can be preserved in some cases, and the augmented version can be applied in others. For instance, the flit can utilize one or more bits to indicate whether the flit is according to the base or modified flit format. A receiving SMC (or node) can decode the flit to determine which format is applied to the flit. In one example, such as shown in FIG. 12, a bit can be provided to indicate whether Slot 2 of the base flit format is being repurposes to provide extended memory address bits and/or source node ID bits, among other examples. In one example, the bit can occupy a defined virtual network bit in cases where only a single virtual network (e.g., VN0) is to be used. Indeed, the bit to indicate how Slot 2 is to be used, can itself represent a modification to a base flit format, among other examples. In one example, a Mode bit (e.g., in row UI0 of the example of FIG. 12) can be reused to designate that Slot 2 is to be used to extend the address is the base flit format, among other examples.

As introduced above, in some implementations, a flit format can be provided that indicates both an identifier of the source SMC and the destination SMC. In some alternative embodiments, only the source SMC identifier (or "node ID") may be provided, and the destination SMC can be identified implicitly from the address bits provided to indicate the corresponding line of memory involved in the transaction. In other words, an SMC can determine that a particular line of memory referenced in the address field of a flit corresponds to a memory accessed through a particular SMC in a plurality of SMCs in a shared memory architecture. For instance, a record can be maintained at each SMC denoting which addresses corresponding to which memory elements connected directly to which SMC. In other implementations, upper order address bits (e.g., those added in the extension of a flit address field) can correspond to particular SMCs within the shared memory architecture. Accordingly, the destination SMC (connected to the target memory address) can be identified by another SMC from the extended memory address field of the flit. The flits can be decoded by each SMC at each "hop" of the routing of a request flit to its destination. Each SMC can thus identify the destination SMC from the address bits and determine the next hop to allow the request to progress toward the destination SMC.

Processor nodes in a shared memory architecture employing multiple different SMCs each managing a subset of the pooled and/or shared system memory, can be ignorant of the architecture used to access request line of memory from its directly-connected (or "local") SMC. For instance, the processor node can be blind to its local SMC determining that another SMC manages a requested portion of memory and forwarding the node's request for handling by the other SMC. All the node sees is that it sent a request to its local SMC and received a corresponding response. The node may also be ignorant to the fact that the requested line of memory is in pooled memory. Consequently, in some cases, a node may send a flit corresponding to a request involving a particular line of memory and send the flit according to a single-node buffered memory link protocol (e.g., without the augmented fields provided for in a shared memory link protocol followed between SMCs). In such instances, at the ingress port of the local SMC, the additional enhancement fields (such as the ones shown in the examples of Table 1 or FIG. 12) can be attached to the flit (or packet) before sending it out within the SMC. On egress (e.g., to the processor node) these enhanced fields can be stripped away.

In some case, processor nodes may be ill equipped to properly track their transactions, given the potential complexity involving multiple hops between SMCs in the shared memory architecture that may be hidden from the processor nodes. Accordingly, a local SMC can track transactions on behalf of its respective processor node(s). The node's local SMC can preserve all the routing related fields that were included in original flits of the request (e.g., as included in the flit as formatted according to the node's buffered memory link protocol (which may be different from the SML protocol)). As an SMC can then be responsible for potentially large numbers of transactions, memory of the SMC itself can be allocated to accommodate the tracking of the transaction information. In some instances, the SMC can optimize the number of bits tracked for each transaction by assigning or translating fields of the original request to values with less bits than the original. For instance, the SMC can assign an RHTID field value at an SMC-level with presumably less bits than the original. The transaction information can be stored in on-chip (i.e., on-SMC) storage with a CAM look-up ability to retrieve the original bits on egress. The on-chip memory can be supplemented (or replaced instead) with the local memory (e.g., buffered memory managed by the SMC) as storage above and beyond what would be available in on-chip memory, among other examples.

It should be appreciated that the implementations described herein are provided as examples to illustrate certain principles and features disclosed in the Specification. It should be appreciated that alternative configurations, protocols, and architectures (other than those specifically discussed in the examples) can utilize and apply such principles and features. As an example of one alternative, PCIe memory read/write can be used (e.g., instead of SMI3 protocol) that is enhanced with directory information. The directory information can be implemented through reserve bits of the PCIe packet. In another example, CPU nodes can utilize a cache controller (e.g., as an alternative to a shared memory controller) to send memory read/write transactions on a PCIe link, for instance, based on a remote address range check, among other potential examples and alternatives.

Figure 13A:
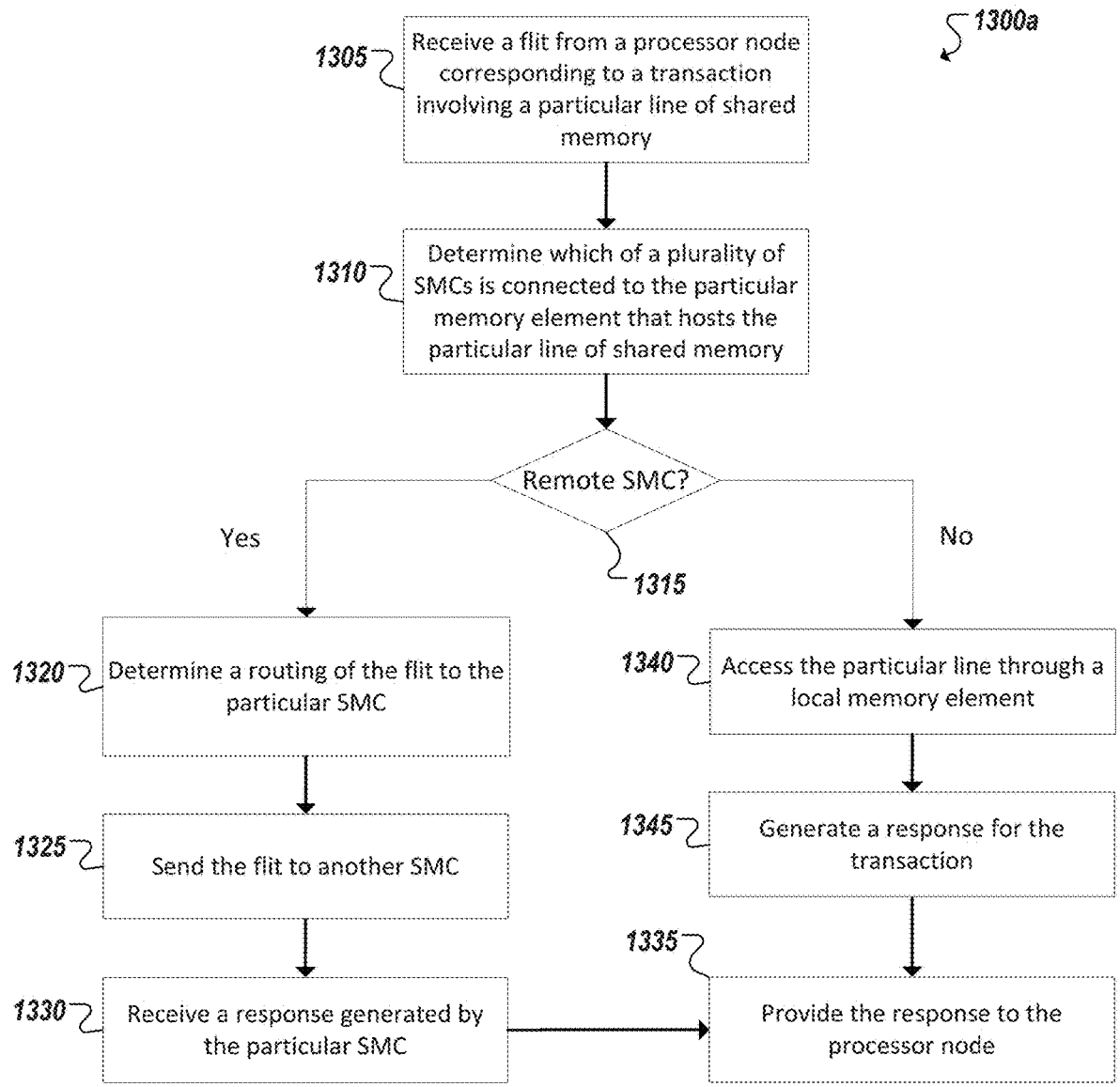
FIGS. 13A-13B are flowcharts illustrating example techniques for routing transactions within a shared memory architecture.
Figure 13B:
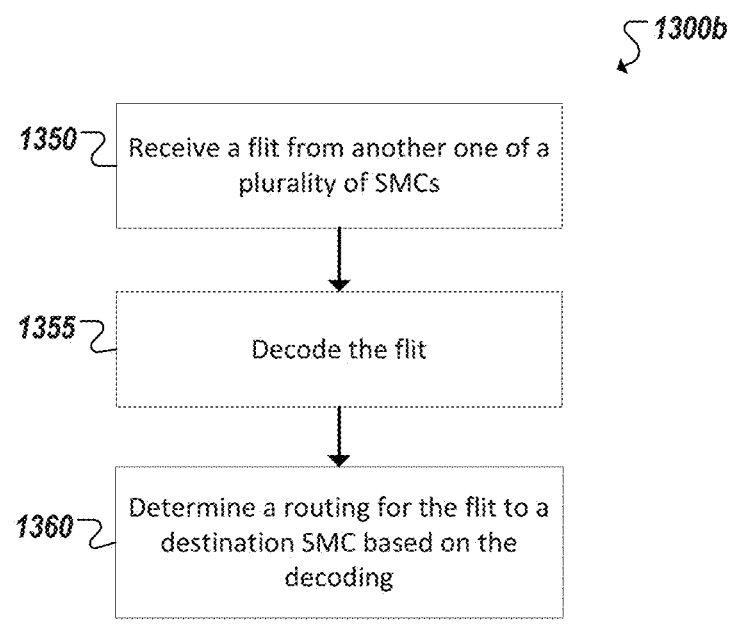

Turning to FIGS. 13A-13B, flowcharts 1300a-b are shown illustrating example techniques for communicating using a shared memory link interconnect. For instance, in FIG. 13A, a load/store memory access message can be received 1305 at one of a plurality of shared memory controllers (SMCs) (e.g., over an SML link) from a processor node, the message requesting data of a particular address of shared memory. The message can be embodied in one or more flits, including a header flit to identify the particular address. The shared memory controller can determine 1310 from the particular address (or a destination node identifier identifying a particular one of the SMCs), that the message (or "request") is to be handled by the particular SMC because the particular SMC manages a particular one of the shared memory elements in the system that hosts the particular address. In some cases, the SMC connected directly to the processor node is the particular SMC. In other cases, the particular SMC is another one of the plurality of SMCs. The SMC can determine whether it or another one of the SMCs is to handle the request (e.g., at 1315). In cases where the SMC determines that another SMC is the particular SMC for handling the request, the SMC can determine 1320 how to route the request to the particular SMC. In some cases this can involve sending the request to an intervening one of the plurality of SMCs. In other cases, the SMC can determine that the routing involves sending the request directly (e.g., over a single SML link) to the particular other SMC. The SMC then sends 1325 the request (e.g., over an SML link) to the other SMC (either the particular SMC or intervening SMC). In some implementations, the format of the flit used by the processor node in its request may be augmented by the SMC to facilitate routing of the flit within a network of SMCs. For instance, the SMC may utilize one of a plurality of slots to extend an address indicated by the processor node, add a source or destination node identifier to indicate the source or destination SMC in the transaction, encode bits to indicate that the particular flit slot is being used for these purposes, among other modifications.

Once the particular SMC accesses the particular line of shared memory corresponding to the particular address, the particular SMC can send a response back to the SMC connected to the particular node. The response can include enhanced fields (such as those included in the request flits) that are used to assist in routing the response back to the source SMC (e.g., the source node ID). After being routed back along the same or a different path within a network of SMCs, the SMC connected to the particular node can receive 1330 a response generated by the particular SMC and can provide 1335 the response to the processor node. In cases where the flit format used between the SMCs represents an augmented version of a flit consumed by the processor node, the SMC can strip "extra" or enhanced fields from a response flit before providing 1335 the response to the processor node. The response may appear to the processor node as having been handled entirely by the SMC it is connected with. In other words, the node may be ignorant of that fact that the line of memory is managed by another SMC and that the request was routed over one or more other SMCs in a network of SMCs in a shared memory architecture.

In cases where the SMC determines (e.g., at 1315) that it manages the memory element hosting the requested line of memory, the SMC can access 1340 the particular line of memory from the memory element, generate the response 1345, and provide 1335 the response to the processor node.

In the example of FIG. 13B, an SMC may receive 1350 a flit from another SMC in connection with the routing of the flit between a source SMC and a destination SMC. The source SMC is connected to a processor node responsible for generating the memory (e.g., load/store) request involving a particular line of shared memory at a particular address. The destination SMC is connected to the memory element hosting the particular line of shared memory. The destination SMC generates a response to the request upon accessing the particular line of shared memory. The flit can include fields such as an extended address field, source node ID to identify the source SMC, a destination node ID to identify the destination SMC, an alternate routing path field to indicate a particular one of a plurality of available routing paths in a network of SMCs, among other fields. Such fields can be included in both request and response flits. Further, the fields can be added to augment a base flit format, such as a flit format defined according to a single node buffered memory access protocol, a GPIO protocol, or another protocol. Each SMC in the routing path can decode 1355 the flit to determine 1360 the next hop in the routing. For instance, in cases where the flit represents a request, the flit can be decoded to identify the extended address of the particular line of memory. The SMC can determine from the extended address the destination SMC and determine how (e.g., either directly or over which intermediate SMC) to forward the request to the destination SMC. In other instances, the SMC can alternatively (or additionally) consult a destination node ID field of the flit. In cases where the flit embodies at least a portion of a response to a request (generated by the destination SMC), the SMC can decode 1355 the flit to identify a source node ID corresponding to the source SMC and determine a next step in a corresponding routing path to route the response flit to the source SMC for delivery to the processor node originating the transaction. In some cases, this return routing path may be the identical (but reverse) path used to send the request from the source SMC to the destination SMC. In other cases, an alternate path can be used to send the response from the source SMC to the destination SMC.

It should be noted that while much of the above principles and examples are described within the context of PCIe and particular revisions of the PCIe specification, the principles, solutions, and features described herein can be equally applicable to other protocols and systems. For instance, analogous lane errors can be detected in other links using other protocols based on analogous symbols, data streams, and tokens, as well as rules specified for the use, placement, and formatting of such structures within data transmitted over these other links. Further, alternative mechanisms and structures (e.g., beside a PCIe LES register or SKP OS) can be used to provide lane error detection and reporting functionality within a system. Moreover, combinations of the above solutions can be applied within systems, including combinations of logical and physical enhancements to a link and its corresponding logic as described herein, among other examples.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 14:
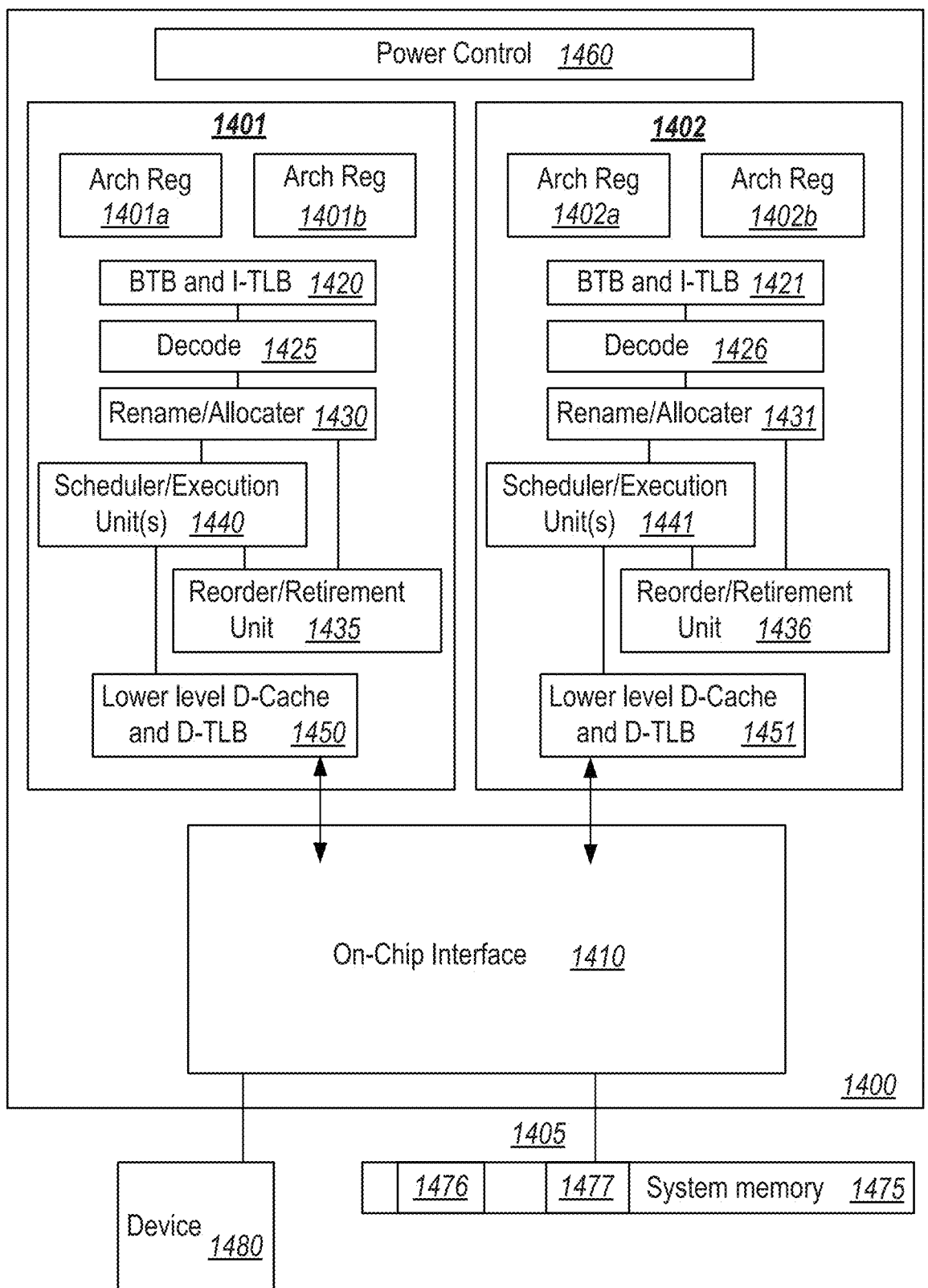
FIG. 14 illustrates an embodiment of a block diagram for a computing system including a multicore processor.

Referring to FIG. 14, an embodiment of a block diagram for a computing system including a multicore processor is depicted. Processor 1400 includes any processor or processing device, such as a microprocessor, an embedded processor, a digital signal processor (DSP), a network processor, a handheld processor, an application processor, a co-processor, a system on a chip (SOC), or other device to execute code. Processor 1400, in one embodiment, includes at least two cores—core 1401 and 1402, which may include asymmetric cores or symmetric cores (the illustrated embodiment). However, processor 1400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1400, as illustrated in FIG. 14, includes two cores—core 1401 and 1402. Here, core 1401 and 1402 are considered symmetric cores, i.e. cores with the same configurations, functional units, and/or logic. In another embodiment, core 1401 includes an out-of-order processor core, while core 1402 includes an in-order processor core. However, cores 1401 and 1402 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1401 are described in further detail below, as the units in core 1402 operate in a similar manner in the depicted embodiment.

As depicted, core 1401 includes two hardware threads 1401a and 1401b, which may also be referred to as hardware thread slots 1401a and 1401b. Therefore, software entities, such as an operating system, in one embodiment potentially view processor 1400 as four separate processors, i.e., four logical processors or processing elements capable of executing four software threads concurrently. As alluded to above, a first thread is associated with architecture state registers 1401a, a second thread is associated with architecture state registers 1401b, a third thread may be associated with architecture state registers 1402a, and a fourth thread may be associated with architecture state registers 1402b. Here, each of the architecture state registers (1401a, 1401b, 1402a, and 1402b) may be referred to as processing elements, thread slots, or thread units, as described above. As illustrated, architecture state registers 1401a are replicated in architecture state registers 1401b, so individual architecture states/contexts are capable of being stored for logical processor 1401a and logical processor 1401b. In core 1401, other smaller resources, such as instruction pointers and renaming logic in allocator and renamer block 1430 may also be replicated for threads 1401a and 1401b. Some resources, such as re-order buffers in reorder/retirement unit 1435, ILTB 1420, load/store buffers, and queues may be shared through partitioning. Other resources, such as general purpose internal registers, page-table base register(s), low-level data-cache and data-TLB 1415, execution unit(s) 1440, and portions of out-of-order unit 1435 are potentially fully shared.

Processor 1400 often includes other resources, which may be fully shared, shared through partitioning, or dedicated by/to processing elements. In FIG. 14, an embodiment of a purely exemplary processor with illustrative logical units/resources of a processor is illustrated. Note that a processor may include, or omit, any of these functional units, as well as include any other known functional units, logic, or firmware not depicted. As illustrated, core 1401 includes a simplified, representative out-of-order (OOO) processor core. But an in-order processor may be utilized in different embodiments. The OOO core includes a branch target buffer 1420 to predict branches to be executed/taken and an instruction-translation buffer (I-TLB) 1420 to store address translation entries for instructions.

Core 1401 further includes decode module 1425 coupled to fetch unit 1420 to decode fetched elements. Fetch logic, in one embodiment, includes individual sequencers associated with thread slots 1401*a*, 1401*b*, respectively. Usually core 1401 is associated with a first ISA, which defines/specifies instructions executable on processor 1400. Often machine code instructions that are part of the first ISA include a portion of the instruction (referred to as an opcode), which references/specifies an instruction or operation to be performed. Decode logic 1425 includes circuitry that recognizes these instructions from their opcodes and passes the decoded instructions on in the pipeline for processing as defined by the first ISA. For example, as discussed in more detail below decoders 1425, in one embodiment, include logic designed or adapted to recognize specific instructions, such as transactional instruction. As a result of the recognition by decoders 1425, the architecture or core 1401 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1426, in one embodiment, recognize the same ISA (or a subset thereof). Alternatively, in a heterogeneous core environment, decoders 1426 recognize a second ISA (either a subset of the first ISA or a distinct ISA).

In one example, allocator and renamer block 1430 includes an allocator to reserve resources, such as register files to store instruction processing results. However, threads 1401*a* and 1401*b* are potentially capable of out-of-order execution, where allocator and renamer block 1430 also reserves other resources, such as reorder buffers to track instruction results. Unit 1430 may also include a register renamer to rename program/instruction reference registers to other registers internal to processor 1400. Reorder/retirement unit 1435 includes components, such as the reorder buffers mentioned above, load buffers, and store buffers, to support out-of-order execution and later in-order retirement of instructions executed out-of-order.

Scheduler and execution unit(s) block 1440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1450 are coupled to execution unit(s) 1440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1401 and 1402 share access to higher-level or further-out cache, such as a second level cache associated with on-chip interface 1410. Note that higher-level or further-out refers to cache levels increasing or getting further way from the execution unit(s). In one embodiment, higher-level cache is a last-level data cache—last cache in the memory hierarchy on processor 1400—such as a second or third level data cache. However, higher level cache is not so limited, as it may be associated with or include an instruction cache. A trace cache—a type of instruction cache—instead may be coupled after decoder 1425 to store recently decoded traces. Here, an instruction potentially refers to a macro-instruction (i.e. a general instruction recognized by the decoders), which may decode into a number of micro-instructions (micro-operations).

In the depicted configuration, processor 1400 also includes on-chip interface module 1410. Historically, a memory controller, which is described in more detail below, has been included in a computing system external to processor 1400. In this scenario, on-chip interface 1410 is to communicate with devices external to processor 1400, such as system memory 1475, a chipset (in some cases including a memory controller hub or shared memory controller to connect to memory 1475 and an I/O controller hub to connect peripheral devices), a memory controller hub, a northbridge, or other integrated circuit. And in this scenario, link 1405 may include any known interconnect, such as multi-drop bus, a point-to-point interconnect, a serial interconnect, a parallel bus, a coherent (e.g. cache coherent) bus, a layered protocol architecture, a differential bus, a GTL bus, or an SML link.

Memory 1475 may be dedicated to processor 1400 or shared with other devices in a system. Common examples of types of memory 1475 include DRAM, SRAM, non-volatile memory (NV memory), and other known storage devices. Note that device 1480 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1400. For example in one embodiment, a memory controller hub is on the same package and/or die with processor 1400. Here, a portion of the core (an on-core portion) 1410 includes one or more controller(s) for interfacing with other devices such as memory 1475 or a graphics device 1480. The configuration including an interconnect and controllers for interfacing with such devices is often referred to as an on-core (or un-core configuration). As an example, on-chip interface 1410 includes a ring interconnect for on-chip communication and a high-speed serial point-to-point link 1405 for off-chip communication. Yet, in the SOC environment, even more devices, such as the network interface, co-processors, memory 1475, graphics processor 1480, and any other known computer devices/interface may be integrated on a single die or integrated circuit to provide small form factor with high functionality and low power consumption.

In one embodiment, processor 1400 is capable of executing a compiler, optimization, and/or translator code 1477 to compile, translate, and/or optimize application code 1476 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1410 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, a method, and hardware- and/or software-based logic (e.g., implemented in a shared memory controller) to a first interface to receive a flit associated with a memory transaction. The particular shared memory controller is to control access to a portion of a shared memory resource having a plurality of memory elements. The flit can include a node identifier field to identify a particular one of a plurality of processor nodes as a source of the transaction.

In one example, the flit includes at least three slots.

In one example, at least two of the slots are to identify addresses of two different transactions and a third of the at least three slots is to provide bits to extend the addresses identified in the at least two of the slots.

In one example, the flit is to further include a field to indicate whether the third slot is used to extend the addresses identified in the at least two of the slots.

In one example, the flit has a format of a single node buffered memory link protocol when the filed indicates that the third slot is not used to extend ranges of the addresses identified in the at least two of the slots.

In one example, the particular shared memory controller is further to decode the flit and determine a routing for the flit based on the decoding.

In one example, the particular shared memory controller further includes a second interface to route the flit to another one of the plurality of shared memory controllers based on the decoding.

In one example, the other shared memory controller is determined implicitly from an address field of the flit.

In one example, the other shared memory controller is determined from a shared memory controller number encoded in a destination node field of the flit.

In one example, the particular shared memory controller directly connects to and manages access to a particular subset of the plurality of memory elements corresponding to the portion of the shared memory resource.

In one example, the first interface includes a layered protocol stack.

In one example, the first interface utilizes a shared memory link protocol, and the shared memory link protocol utilizes physical layer logic of a different interconnect protocol.

In one example, the different interconnect protocol includes a Peripheral Component Interconnect Express (PCIe)-based protocol.

One or more embodiments may provide an apparatus, a system, a machine readable storage, a machine readable medium, a method, and hardware- and/or software-based logic (e.g., implemented in a shared memory controller) to receive a flit from another first shared memory controller over a shared memory link, where the flit includes a node identifier (ID) field and an address of a particular line of the shared memory, and the node ID field identifies that the first shared memory controller corresponds to a source of the flit. Further, a second shared memory controller is determined from at least the address field of the flit, where the second shared memory controller is connected to a memory element corresponding to the particular line. The flit can be forwarded to the second shared memory controller using a shared memory link according to a routing path.

In one example, the routing path to the second shared memory controller is to be determined.

In one example, the routing path is one of a plurality of alternate routing paths to the second shared memory controller and the shared memory controller is to determine a particular one of the plurality of alternate routing paths from a field in the flit.

In one example, another flit is generated to correspond to another transaction to involve another line of the shared memory, the other flit is to include a node ID field and an address of the other line of the shared memory, and the node ID field of the other flit is to identify that the shared memory controller corresponds to a source of the other transaction.

One or more embodiments may provide a system that includes a shared memory including a plurality of memory elements, a shared memory controller to manage access to a subset of the plurality of memory elements, and at least one processor node connected to the shared memory controller by a shared memory link. The processor node is to generate a flit to correspond to a transaction to involve a particular address of the shared memory and send the flit to the shared memory controller. The shared memory controller can further identify a particular one of a plurality of shared memory controllers that corresponds to the particular address and determine a routing path for providing the flit to the particular shared memory.

In one example, the shared memory controller is to deliver a result of the transaction to the processor node.

In one example, the shared memory controller includes a first shared memory controller, the subset of the plurality of memory elements includes a first subset of the memory elements. The processor node includes a first processor node, and the system further includes a first device including the first shared memory controller, the first subset of the memory elements, and the one or more nodes, and a second device connected to the first device by a shared memory link, where the second device includes a second shared memory controller, a second subset of the memory elements, and a second processor node.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a first device comprising at least a portion of an interconnect fabric, a first shared memory controller to control access to first shared memory, and a first plurality of processor nodes, wherein the first device further comprises an interface to receive a data request from a second device over a data link, the interface comprises physical layer circuitry to implement a physical layer for the data link according to a physical layer protocol, and the interface further comprises first link layer circuitry to implement a first link layer protocol and second link layer circuitry to implement a different second link layer protocol,
wherein the data link comprises a plurality of lanes, the data link supports multiplexing of data of the different first and second link layer protocols over the same physical layer of the data link, the first shared memory is not directly connected to the processor nodes, and the second device comprises a second shared memory controller to couple and control access to second shared memory, and a second plurality of processor nodes,
wherein the data request comprises link layer data, the data request is addressed to be routed to the first memory controller through the interconnect fabric from the second device, and the first memory controller is to handle the data request, wherein the data request comprises a node identifier to identify a particular processor node of the second plurality of processor nodes as a source of the data request, and the data request further comprises an address to identify a portion of the first shared memory associated with the data request.

2. The apparatus of claim 1, wherein the first and second shared memory comprise shared memory of a platform comprising the first device and the second device.

3. The apparatus of claim 1, wherein the first shared memory comprises dynamic random-access memory (DRAM).

4. The apparatus of claim 3, wherein the first shared memory comprises dual in-line memory module (DIMM) memory.

5. The apparatus of claim 1, wherein the first memory controller is coupled directly to the first shared memory by a double data rate (DDR) connection.

6. The apparatus of claim 1, wherein the data link comprises a physical layer based at least in part on a Peripheral Component Interconnect Express (PCIe)-based physical layer.

7. The apparatus of claim 1, wherein the interface comprises a serializer/deserializer (SerDes).

8. The apparatus of claim 1, wherein the data link comprises a multilane link.

9. The apparatus of claim 8, wherein the multilane link comprises at least eight lanes.

10. The apparatus of claim 1, wherein the data request comprises one of a read request or write request of the portion of the first shared memory.

11. A system comprising:
a first die comprising at least a portion of an interconnect fabric, a first memory controller to couple to first shared memory, and a first plurality of processor nodes, wherein the first plurality of processor nodes are not directly connected; and
a second die, coupled to the first die by a data link, wherein the second die comprises a second memory controller to couple to second shared memory, and a second plurality of processor nodes,
wherein the data link comprises a plurality of lanes, the data link supports multiplexing of data of different link layer protocols over a common physical layer of the data link, a particular one of the first plurality of processor nodes is to send a memory request, the memory request is to be routed to the second memory controller, and the second memory controller is to handle the memory request, wherein the memory request comprises link layer data comprising a node identifier to identify the particular processor node and an address to identify a portion of the second shared memory.

12. The system of claim 11, wherein the second die implements at least a portion of the interconnect fabric.

13. The system of claim 11, wherein the system comprises a rack server system.

14. The system of claim 11, wherein the first and second memory comprise shared memory of the system.

15. The system of claim 11, wherein the first and second memory each respectively comprise dynamic random-access memory (DRAM).

16. The system of claim 15, wherein the first and second memory each respectively comprise dual in-line memory module (DIMM) memory.

* * * * *